(12) United States Patent
Somasundaram

(10) Patent No.: US 11,423,387 B2
(45) Date of Patent: Aug. 23, 2022

(54) PROCESSING PAYMENTS

(71) Applicant: GP NETWORK ASIA PTE. LTD., Singapore (SG)

(72) Inventor: Manicavasagam Somasundaram, Bangalore (IN)

(73) Assignee: GP NETWORK ASIA PTE. LTD., Singapore (SG)

( * ) Notice: Subject to any disclaimer, the term of this patent is extended or adjusted under 35 U.S.C. 154(b) by 0 days.

(21) Appl. No.: 16/627,916

(22) PCT Filed: Jul. 2, 2018

(86) PCT No.: PCT/SG2018/050322
§ 371 (c)(1),
(2) Date: Dec. 31, 2019

(87) PCT Pub. No.: WO2019/009804
PCT Pub. Date: Jan. 10, 2019

(65) Prior Publication Data
US 2021/0110377 A1  Apr. 15, 2021

(30) Foreign Application Priority Data

Jul. 3, 2017 (IN) .............................. 201742023363

(51) Int. Cl.
*G06Q 20/20* (2012.01)
*H04W 48/16* (2009.01)
(Continued)

(52) U.S. Cl.
CPC ......... *G06Q 20/325* (2013.01); *G06Q 20/204* (2013.01); *G06Q 20/326* (2020.05);
(Continued)

(58) Field of Classification Search
None
See application file for complete search history.

(56) References Cited

U.S. PATENT DOCUMENTS 5,808,197 A * 9/1998 Dao .................. G01P 15/12
73/514.09
6,400,835 B1 * 6/2002 Lemelson ............ G06V 40/161
382/118

(Continued)

FOREIGN PATENT DOCUMENTS

CA       2621358 A1   3/2007
CN     103927654 A    7/2014
(Continued)

OTHER PUBLICATIONS

Problem Reduction in Online Payment System Using Hybrid Model Sandeep Pratap Singh1, Shiv Shankar P. Shukla, International Journal of Managing Information Technology(IJMIT) Aug. 2011, vol. 3, No. 3 ISSN : 0975-5586 (Online) ;0975-5926 (Print)). (Hybrid (Year: 2011).*

(Continued)

*Primary Examiner* — Chikaodinaka Ojiaku
(74) *Attorney, Agent, or Firm* — Nixon Peabody LLP; Jeffrey L. Costeliia

(57) ABSTRACT

A personal communication device for processing financial information via a payment terminal, the payment terminal being configured to output a wireless signal is configured to receive the wireless signal of a payment terminal; determine whether the received wireless signal has a strength above a first signal threshold. If the received signal strength is above the first signal strength threshold, it emits a wireless request signal to cause the payment terminal to establish a communication channel with the personal communication device, wherein the request signal causes the payment terminal to establish only one communication channel, wherein the communication channel is only between the said personal communication device and the payment terminal. When a financial transaction at said personal communication device is concluded, it emits a wireless release signal to close down (Continued)

the communication channel so that the payment terminal can establish another communication channel with another personal communication device.

13 Claims, 17 Drawing Sheets

(51) Int. Cl.
    *G06Q 20/32*     (2012.01)
    *H04W 84/18*    (2009.01)
(52) U.S. Cl.
    CPC ..... *G06Q 20/3221* (2013.01); *G06Q 20/3278* (2013.01); *H04W 48/16* (2013.01); *H04W 84/18* (2013.01)

(56) References Cited

U.S. PATENT DOCUMENTS

| | | | | |
|---|---|---|---|---|
| 7,430,537 B2 * | 9/2008 | Templeton | ......... | G06Q 20/4093 705/40 |
| 8,064,650 B2 * | 11/2011 | Webb | ......... | H04N 5/23219 382/118 |
| 8,275,312 B2 * | 9/2012 | Fisher | ......... | G06Q 20/425 340/5.4 |
| 8,296,204 B2 * | 10/2012 | Templeton | ......... | G06Q 20/341 705/40 |
| 8,370,259 B2 * | 2/2013 | Templeton | ......... | G06Q 20/4014 705/40 |
| 8,417,637 B2 * | 4/2013 | Templeton | ......... | G06Q 10/0635 705/40 |
| 8,515,871 B2 * | 8/2013 | Templeton | ......... | G06Q 20/12 705/40 |
| 8,606,492 B1 * | 12/2013 | Botnen | ......... | G07C 5/008 701/123 |
| 8,620,487 B2 * | 12/2013 | Cochran | ......... | G07C 9/257 340/5.82 |
| 8,856,045 B1 * | 10/2014 | Patel | ......... | G06Q 20/3829 705/79 |
| 8,863,256 B1 * | 10/2014 | Addepalli | ......... | H04W 48/02 713/168 |
| 8,988,188 B2 * | 3/2015 | Chang | ......... | G07C 9/00563 340/5.53 |
| 9,576,189 B2 * | 2/2017 | Lim | ......... | G06V 40/16 |
| 9,940,612 B1 * | 4/2018 | Hamilton | ......... | G06Q 20/4012 |
| 10,878,418 B2 * | 12/2020 | Hamilton | ......... | G06Q 20/4012 |
| 2004/0260647 A1 * | 12/2004 | Blinn | ......... | G06Q 30/06 705/41 |
| 2006/0072792 A1 * | 4/2006 | Toda | ......... | B60R 25/255 382/115 |
| 2006/0261931 A1 * | 11/2006 | Cheng | ......... | G06V 40/45 340/5.53 |
| 2006/0271286 A1 * | 11/2006 | Rosenberg | ......... | G01C 21/3647 701/431 |
| 2006/0277043 A1 * | 12/2006 | Tomes | ......... | G10L 17/24 704/E17.016 |
| 2008/0051059 A1 * | 2/2008 | Fisher | ......... | G06Q 20/327 455/410 |
| 2008/0300755 A1 * | 12/2008 | Madau | ......... | B60W 30/09 340/3.1 |
| 2008/0312998 A1 * | 12/2008 | Templeton | ......... | G06Q 20/382 705/7.29 |
| 2009/0237226 A1 * | 9/2009 | Okita | ......... | B60W 10/184 340/435 |
| 2010/0033570 A1 * | 2/2010 | Plaster | ......... | B60R 1/00 348/148 |
| 2010/0088021 A1 * | 4/2010 | Viner | ......... | G06Q 30/02 709/201 |
| 2010/0188494 A1 * | 7/2010 | Mukai | ......... | H04N 1/00249 348/E7.085 |
| 2011/0025529 A1 * | 2/2011 | Uechi | ......... | G08G 1/096783 340/905 |
| 2011/0249144 A1 * | 10/2011 | Chang | ......... | H04N 9/8233 348/E5.031 |
| 2012/0054103 A1 * | 3/2012 | Templeton | ......... | G06Q 20/389 705/44 |
| 2012/0054104 A1 * | 3/2012 | Templeton | ......... | G06Q 20/4093 705/44 |
| 2012/0054845 A1 * | 3/2012 | Rodriguez | ......... | G06F 21/316 726/7 |
| 2012/0109823 A1 * | 5/2012 | Templeton | ......... | G06Q 40/025 705/44 |
| 2012/0148117 A1 * | 6/2012 | Chang | ......... | G06V 40/50 382/118 |
| 2012/0203646 A1 * | 8/2012 | Morgan | ......... | G06Q 20/322 705/21 |
| 2012/0259717 A1 * | 10/2012 | Griffin | ......... | G06Q 20/3276 705/17 |
| 2012/0271725 A1 * | 10/2012 | Cheng | ......... | G06Q 20/202 705/21 |
| 2012/0303448 A1 * | 11/2012 | Psillas | ......... | G06Q 40/02 705/43 |
| 2012/0316951 A1 * | 12/2012 | Fisher | ......... | G06Q 20/20 705/21 |
| 2012/0323653 A1 * | 12/2012 | Fisher | ......... | G06Q 20/425 705/16 |
| 2012/0323670 A1 * | 12/2012 | Fisher | ......... | H04M 11/00 705/16 |
| 2012/0329394 A1 * | 12/2012 | Fisher | ......... | G06Q 20/20 455/41.1 |
| 2013/0012131 A1 * | 1/2013 | Fisher | ......... | H04M 1/72412 455/41.2 |
| 2013/0013352 A1 * | 1/2013 | Fisher | ......... | H04M 11/00 705/5 |
| 2013/0013353 A1 * | 1/2013 | Fisher | ......... | G06Q 20/425 705/5 |
| 2013/0013432 A1 * | 1/2013 | Fisher | ......... | H04W 4/50 705/18 |
| 2013/0017784 A1 * | 1/2013 | Fisher | ......... | G06Q 20/325 455/41.1 |
| 2013/0018740 A1 * | 1/2013 | Fisher | ......... | G06Q 20/325 705/18 |
| 2013/0018742 A1 * | 1/2013 | Fisher | ......... | G06Q 20/327 705/44 |
| 2013/0024220 A1 * | 1/2013 | Fisher | ......... | H04W 4/023 705/26.1 |
| 2013/0024221 A1 * | 1/2013 | Fisher | ......... | G06Q 20/325 705/16 |
| 2013/0024280 A1 * | 1/2013 | Fisher | ......... | G06Q 20/327 705/14.51 |
| 2013/0052952 A1 * | 2/2013 | Fisher | ......... | G06Q 30/06 455/41.1 |
| 2013/0073114 A1 * | 3/2013 | Nemat-Nasser | ...... | G06V 20/597 382/104 |
| 2013/0095761 A1 * | 4/2013 | Chu | ......... | H04W 36/30 455/41.2 |
| 2013/0134214 A1 * | 5/2013 | Williams | ......... | G07G 1/12 235/375 |
| 2013/0185214 A1 * | 7/2013 | Azen | ......... | G06Q 20/20 705/76 |
| 2013/0191227 A1 * | 7/2013 | Pasa | ......... | G06Q 20/027 705/41 |
| 2013/0195316 A1 * | 8/2013 | Bataller | ......... | G06V 40/173 382/103 |
| 2013/0232142 A1 * | 9/2013 | Nielsen | ......... | G06Q 30/02 707/736 |
| 2013/0267176 A1 * | 10/2013 | Hertel | ......... | G06Q 20/204 455/509 |
| 2013/0268400 A1 * | 10/2013 | Ballard | ......... | G06Q 30/0641 705/26.8 |
| 2013/0332364 A1 * | 12/2013 | Templeton | ......... | G06Q 20/382 705/44 |
| 2013/0339253 A1 * | 12/2013 | Sincai | ......... | G06Q 20/3227 705/14.15 |
| 2014/0032419 A1 * | 1/2014 | Anderson | ......... | G06Q 20/227 705/64 |
| 2014/0040145 A1 * | 2/2014 | Ozvat | ......... | G06Q 20/401 705/64 |

(56) References Cited

U.S. PATENT DOCUMENTS

| | | | |
|---|---|---|---|
| 2014/0040148 A1* | 2/2014 | Ozvat | G06Q 20/20 705/71 |
| 2014/0114860 A1* | 4/2014 | Ozvat | G06Q 30/06 705/64 |
| 2014/0121927 A1* | 5/2014 | Hanita | B60T 7/14 701/70 |
| 2014/0122274 A1* | 5/2014 | Argue | G06Q 20/047 705/24 |
| 2014/0240092 A1* | 8/2014 | Nielsen | G06Q 30/0272 340/5.81 |
| 2014/0249948 A1* | 9/2014 | Graylin | G06Q 20/326 705/21 |
| 2014/0282880 A1* | 9/2014 | Herter | H04L 63/205 726/4 |
| 2014/0358427 A1* | 12/2014 | Fuhrman | G01C 21/3658 701/488 |
| 2015/0097671 A1* | 4/2015 | Laflen | G08B 21/18 340/539.26 |
| 2015/0116493 A1* | 4/2015 | Bala | G06V 40/171 348/148 |
| 2015/0142285 A1* | 5/2015 | Nagata | B60W 30/18154 701/70 |
| 2015/0143492 A1* | 5/2015 | Berry | H04W 12/065 726/7 |
| 2015/0183409 A1* | 7/2015 | Lee | B60T 7/122 701/70 |
| 2015/0186714 A1* | 7/2015 | Ren | B60W 40/09 348/77 |
| 2015/0221341 A1* | 8/2015 | Akay | G06V 40/18 386/278 |
| 2015/0232026 A1* | 8/2015 | Lueke | G06V 20/588 701/1 |
| 2015/0235485 A1* | 8/2015 | Nemat-Nasser | G06F 17/00 701/1 |
| 2015/0239397 A1* | 8/2015 | Smith, Sr. | B60R 11/04 386/226 |
| 2015/0317589 A1* | 11/2015 | Anderson | G06N 20/20 705/7.25 |
| 2015/0379331 A1* | 12/2015 | Nemat-Nasser | G07C 5/02 382/118 |
| 2016/0063235 A1* | 3/2016 | Tussy | H04W 12/06 726/6 |
| 2016/0101783 A1* | 4/2016 | Abou-Nasr | B60R 16/037 340/5.82 |
| 2016/0104050 A1* | 4/2016 | Bogner | B60W 40/08 701/1 |
| 2016/0139594 A1* | 5/2016 | Okumura | B60W 30/00 701/2 |
| 2016/0171319 A1* | 6/2016 | Nagai | G06V 40/19 382/103 |
| 2016/0189132 A1* | 6/2016 | Cash | G06Q 20/3224 705/14.57 |
| 2016/0214619 A1* | 7/2016 | Na | B60K 28/066 |
| 2016/0229413 A1* | 8/2016 | Morley | H04N 17/002 |
| 2016/0301842 A1* | 10/2016 | Intagliata | H04N 5/23222 |
| 2016/0318523 A1* | 11/2016 | Kim | B60R 1/00 |
| 2016/0339959 A1* | 11/2016 | Lee | B60W 30/09 |
| 2016/0362050 A1* | 12/2016 | Lee | B60R 1/00 |
| 2016/0371707 A1* | 12/2016 | McLean | G06V 40/174 |
| 2017/0001648 A1* | 1/2017 | An | G06F 17/11 |
| 2017/0004475 A1 | 1/2017 | White et al. | |
| 2017/0021835 A1* | 1/2017 | Kojima | B60W 10/18 |
| 2017/0036673 A1* | 2/2017 | Lee | A61B 3/112 |
| 2017/0116465 A1* | 4/2017 | Ma | G06V 40/172 |
| 2017/0140232 A1* | 5/2017 | Banno | A61B 5/1128 |
| 2017/0154326 A1* | 6/2017 | Jo | H04W 64/00 |
| 2017/0161575 A1* | 6/2017 | Banno | A61B 5/6893 |
| 2017/0264797 A1* | 9/2017 | Trinh | G06V 10/147 |
| 2018/0096329 A1* | 4/2018 | Hamilton | G06Q 20/322 |
| 2018/0181939 A1* | 6/2018 | Hamilton | G06Q 20/322 |
| 2019/0087807 A1* | 3/2019 | Choi | H04L 9/3226 |

FOREIGN PATENT DOCUMENTS

| | | |
|---|---|---|
| CN | 104978655 A | 10/2015 |
| IN | 201711015965 A | 7/2018 |
| KR | 101726420 B1 | 5/2017 |

OTHER PUBLICATIONS

R. Bulander, M. Decker, G. Schiefer and B. Kolmel, "Comparison of Different Approaches for Mobile Advertising," Second IEEE International Workshop on Mobile Commerce and Services, 2005, pp. 174-182, doi: 10.1109/WMCS.2005.8. (Mobile Advertising) (Year: 2005).*

EESR for EP18828094.5 dated Nov. 18, 2020, 9 pages.

India Search and Examination Report for India Application No. 201742023363 dated Mar. 26, 2018, 6 pages.

ISR for PCT/SG2018/050322, dated Sep. 11, 2018, 4 pages.

IPRP for PCT/SG2018/050322 dated Jan. 10, 2019, 7 pages.

* cited by examiner

PROCESSING PAYMENTS

CROSS-REFERENCE TO RELATED APPLICATIONS

This application is the National Phase of International Application PCT/SG2018/050322, filed Jul. 2, 2018, which designated the United States and that International Application was published under PCT Article 21(2) in English. This application also includes a claim of priority under 35 U.S.C. § 119(a) and § 365(b) to Indian Application No. 201742023363, filed Jul. 3, 2017, the entirety of which is hereby incorporated by reference.

FIELD OF THE INVENTION

The invention is in the field of payment technology.

DISCUSSION OF THE RELATED ART

Cashless payments are becoming well used, largely for convenience. Such payments may involve cards or mobile phones. Internet connectivity is a limitation while using mobile phones to implement cashless electronic transactions.

Even though the reach of the Internet is spreading, it is not certain that the user using a mobile device is connected to Internet all the time. Also, use of the Internet may not also be affordable to large sections of the society in parts of the world. In such scenarios, completing an electronic transaction over mobile phones may not be feasible.

Further, conventionally, a merchant may have to deploy different types of payment terminals for enabling different types of digital payments. As an example, the merchant may have to deploy a payment terminal to accept payment using cards. Additionally, the merchant may have to deploy yet another terminal to support payment via mobile phones. Even if such an additional terminal is deployed, the terminal may only support mobile phones that use a specific type of communication technology, such as NFC.

There is a need to improve the situation.

SUMMARY

In a first aspect a payment terminal is used to output signals corresponding to two communication protocols or methods so that when a device capable of responding to one of the two protocols or methods is brought into proximity with the terminal, communication can occur.

In a second aspect a payment terminal is provided and is able to communicate using two different communication methods. In use it outputs signals related to both methods so as to initiate communication with a payment device such as a mobile phone or payment card by means of one of the two methods. Communication being established by one of the two methods, the other method is terminated.

In a third aspect, there is provided a method of operating a payment terminal comprising receiving an activation input, and in response thereto outputting a first wireless signal for communicating with an external payment device of a first type and a second wireless signal for communicating with an external payment device of a second type, wherein the first and second wireless signals are formatted in respective mutually different first and second protocols, receiving a reply to one of the first and second wireless signals and in response to the reply, terminating outputting of the other of the first and second wireless signals.

The method may further comprise processing the reply to authenticate the external payment device to thereby establish a communication channel.

The method may further comprise processing the reply to authenticate the external payment device, and after the processing step implementing the terminating step.

The wireless signals may comprise an NFC signal and a Bluetooth signal.

The method may further comprise processing the reply to authenticate the external payment device to thereby establish a communication channel and receiving from the communication channel data indicative of a user; receiving, at an input, data indicative of a transaction amount and transferring the data indicative of a user and data indicative of a transaction amount to a server.

The method may further comprise processing the reply to authenticate the external payment device to thereby establish a communication channel and receiving from the communication channel data indicative of a user and a one-time verifier for identifying a current transaction; receiving, at an input, data indicative of a transaction amount, transferring the data indicative of a user, data indicative of the one-time verifier and data indicative of a transaction amount to a server.

The method may further comprise outputting a new one-time verifier over the communication channel.

The method may further comprise communicating, with a server, information indicative of which of the first and second wireless signals is responded to.

In a fourth aspect there is disclosed a payment terminal for communicating wirelessly with an external device having a processing device and a store holding instructions to control the processing device to cause the payment terminal to respond to an activation input to output a first wireless signal for communicating with an external payment device of a first type and a second wireless signal for communicating with an external payment device of a second type, wherein the first and second wireless signals are formatted in respective mutually different first and second protocols, and in response to receiving a reply to one of the first and second wireless signals to terminate outputting of the other of the first and second wireless signals.

The payment terminal may further comprise a keypad for providing the activation signal, a display for displaying information under control of the processing device, and an output device for communicating with a server.

The payment terminal may further comprise a first wireless device configured to output the first wireless signal and a second wireless device configured to output the second wireless signal, both under control of the processing device.

The payment terminal may further comprise a security device comprising a store for security keys, the security device being configured to use the keys to encrypt or decrypt data for use by the terminal.

A personal area network device may be configured to output the first wireless signal.

A near field communication device may be configured to output the second wireless signal.

In a fifth aspect a system is provided for processing payments. The system comprises a payment terminal comprising a first wireless communication module and a second wireless communication module. The first module is capable of initiating and establishing proximity communication using a first communication method that is different from a second communication method. The second module is capable of initiating and establishing proximity communication using the second communication method. The payment terminal is configured to receive an input to initiate a transaction; cause the first module and the second module to attempt to initiate communication using their respective method. An external entity capable of being communicated with by one of the first and second methods can be brought into proximity with the payment terminal, so that communication may be initiated between the payment terminal and the external entity depending upon which of one of the communication modules is successful.

The first wireless communication module may be a personal area network module. The second wireless communication module may be a near field communication module. The payment terminal may be further configured to terminate attempts to establish communication channel with any other external entity using the first wireless communication module and the second wireless communication module till said transaction is concluded. The external entity maybe one of a card and a portable communication device, wherein the payment terminal may be further configured to identify whether the communication established is with one of a near field communication tag of the card, a near field communication module of the portable communication device or a personal area network module of the portable communication device. The payment terminal may be further configured to communicate to a server whether the communication established is with one of the near field communication tag of the card, the near field communication module of the portable communication device or the personal area network module of the portable communication device. The external entity may be a portable communication device, wherein the payment terminal may be configured to: receive at least data identifying a user attempting to make a payment connected to the transaction, up on establishing communication with the portable communication device; and communicate at least the data identifying the user, data identifying a merchant and data identifying payment amount to a server to process the transaction, thereby enabling the portable communication device to make payment without using the Internet. The payment terminal may be further configured to: receive, from the external entity, location validation data; verify, based on the location validation data, whether payment can be accepted using the payment terminal; and decline transaction if verified that payment cannot be accepted, or process transaction if verified that payment can be accepted. The external entity may be a card with which near field communication is capable of being established, the payment terminal is configured to: read, from the card, data identifying a user and data to be used as a onetime verifier; write, to the card, a new one-time verifier; and communicate the data identifying the user and the data to be used as the one-time verifier to a server, wherein the one-time verifier is used to verify whether the one-time verifier is what is expected from the card for the current transaction to either reject the transaction or proceed with the transaction. The payment terminal may be further configured to communicate for each transaction, to a server, a unique one-time verifier, wherein the one-time verifier may be used to verify whether the one-time verifier is what is expected from the payment terminal for the current transaction to either reject the transaction or proceed with the transaction. The external entity may be a portable communication device, the payment terminal may be configured to: receive, from the portable communication device, data identifying a user and data to be used as a one-time verifier; update, in the portable communication device, a new one-time verifier; and communicate the data identifying the user and the data to be used as the one-time verifier to a server, wherein the one-time verifier is used to verify whether the one-time verifier is what is expected from the portable communication device for the current transaction to either reject the transaction or proceed with the transaction.

In another aspect, a method is provided for processing payments. The method comprises receiving an input to initiate a transaction at a payment terminal. Thereafter, a first wireless communication module and a second wireless communication module, provided in the payment terminal, attempt to establish a communication channel with an external entity. The first wireless communication module is capable of establishing proximity communication using a first communication channel that is different from a second communication channel, which the second wireless communication module is capable of establishing. The method further comprises, establishing the communication channel with the external entity using one of the first wireless communication module and the second wireless communication module, based on which one of the communication modules is successful in establishing the communication channel with the external entity.

In yet another aspect, a system is provided for processing payments. The system comprises a payment terminal comprising a personal area network (PAN) module. The payment terminal is configured to cause the PAN module to broadcast identifier. The system further comprises a portable communication device. The device is configured to receive identifier broadcasted by the payment terminal; send a request automatically to establish a communication channel with the PAN module of the payment terminal, if signal strength of the broadcasted identifier is over a first threshold; and continue to retain communication with the PAN module of the payment terminal, once the communication channel is established, even if signal strength between the device and the PAN module of the payment terminal falls below the first threshold, till a transaction is concluded.

In still another aspect, a method is provided for processing payments. The method comprises broadcasting an identifier by a personal area network module of a payment terminal; receiving, by a portable communication device, the identifier broadcast by the payment terminal; sending automatically, by the portable communication device, a request to establish a communication channel with the personal area network module of the payment terminal, if signal strength of the broadcasted identifier is over a first threshold. The method further includes, retaining communication between the portable communication device and the personal area network module of the payment terminal, once the communication channel is established, even if signal strength between the portable communication device and the personal area network module of the payment terminal falls below the first threshold, till a transaction is concluded.

There is also disclosed a system for processing payments, the system comprising: a payment terminal comprising a personal area network module, wherein the payment terminal is configured to cause the personal area network module to broadcast identifier; and a portable communication device configured to: receive identifier broadcasted by the payment terminal; send a request automatically to establish a communication channel with the personal area network module of the payment terminal, if signal strength of the broadcasted identifier is over a first threshold; and continue to retain communication with the personal area network module of the payment terminal, once the communication channel is established, even if signal strength between the portable communication device and the personal area network module of the payment terminal falls below the first threshold, till a transaction is concluded.

The first threshold may be configured such that the portable communication device and the payment terminal are within 20 centimetres of each other to establish the communication channel. The first threshold may be configured such that the portable communication device and the payment terminal are within 10 centimetres of each other to establish the communication channel.

The first threshold may be configured such that the portable communication device and the payment terminal are within a preconfigured distance of each other to establish the communication channel.

At least one of the payment terminal or the portable communication device may be configured to terminate the established communication channel, if the signal strength between the portable communication device and the personal area network module of the payment terminal falls below a second threshold.

The second threshold may be remotely reconfigurable.

The payment terminal may be configured to: receive at least data identifying a user attempting to make a payment connected to the transaction, up on establishing the communication channel; and communicate at least the data identifying the user, data identifying a merchant and data identifying payment amount to a server to process the transaction, thereby enabling the portable communication device to make payment without using the Internet.

The payment terminal may be further configured to: receive, from a server, data corresponding to account balance of a user making a payment using the portable communication device; and communicate the data corresponding to the account balance to the portable communication device via the communication channel.

The payment terminal may be further configured to: receive, from a server, data corresponding to transaction information; and communicate at least a part of the data corresponding to the transaction information to the portable communication device via the communication channel.

The payment terminal may be incapable of displaying the account balance of the user; and the portable communication device is configured to display the account balance of the user post the transaction.

The identifier may comprise data identifying compatibility, wherein the portable communication device is configured to consider the payment terminal for automatically requesting to establish the communication channel, if the identifier received by the portable communication device comprises the data identifying compatibility.

The payment terminal may be configured to: receive an input indicating an amount to be transferred; receive an input to begin broadcasting of the identifier, after the input indicating the amount is received; and communicate data corresponding to the amount and a merchant connected to the payment terminal, to the portable communication device, once the communication channel is established, wherein the amount and information corresponding to the merchant are displayed on the portable communication device.

The first threshold may be remotely reconfigurable.

The personal area network module may be one of a BLUETOOTH low energy module or a BLUETOOTH module.

There is also disclosed a method for processing payments, the method comprising: broadcasting identifier by a personal area network module of a payment terminal; receiving, by a portable communication device, identifier broadcasted by the payment terminal; sending automatically, by the portable communication device, a request to establish a communication channel with the personal area network module of the payment terminal, if signal strength of the broadcasted identifier is over a first threshold; and retaining communication between the portable communication device and the personal area network module of the payment terminal, once the communication channel is established, even if signal strength between the portable communication device and the personal area network module of the payment terminal falls below the first threshold till as transaction is concluded.

DETAILED DESCRIPTION

Figure 1:
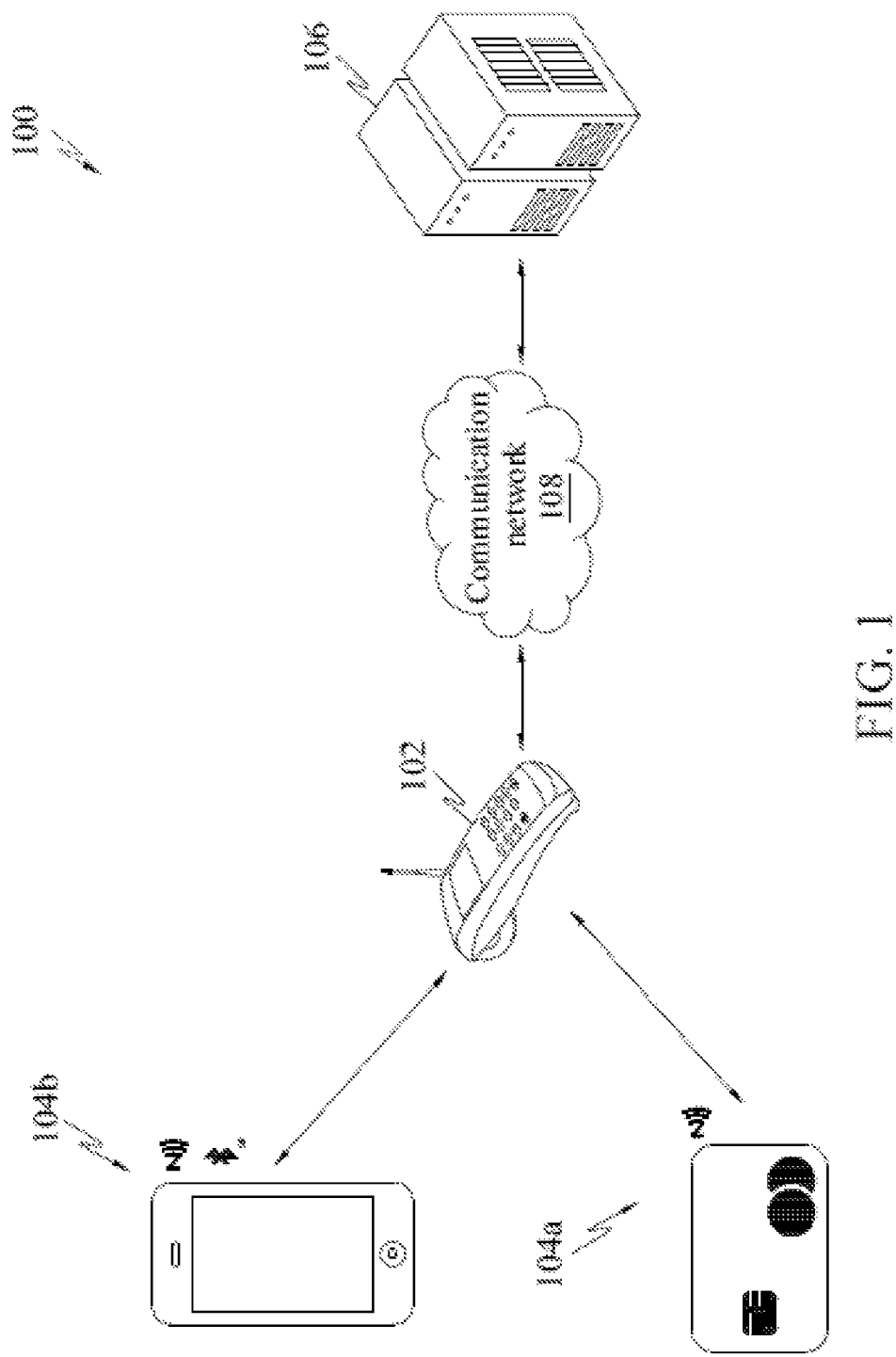
FIG. 1 illustrates a system 100 for processing payments.

In the following description, reference to a phone or smartphone is not intended to be restrictive as to a particular type of portable communication device; the terms are used for convenience and the intention is to cover any type of portable communication device.

Disclosed is a system that is capable of processing payments, without the need for Internet usage by a user making a payment. The payment may be made, for example, using a near field communication (NFC) enabled card or a smartphone with NFC or Bluetooth low energy (BLE) technology.

The payment is facilitated by a payment terminal deployed at a merchant location. The payment terminal may include a personal area network module (BLE module) and a NFC module. In an embodiment, at the initiation of a transaction, the payment terminal is configured to attempt to initiate communication using both BLE and NFC simultaneously, with an external entity presented by the consumer/user to make the payment. The external entity can be a NFC enabled card or a smartphone with NFC or BLUETOOTH low energy (BLE) technology, with an application installed therein to transact with payment terminals.

In another embodiment, the transaction terminal is configured to try one of the BLE and NFC for a period of time and then if unsuccessful to try the other of the BLE and NFC, and if necessary to repeat the trying of both BLE and NFC one after the other.

In an embodiment, once the payment terminal is successful in establishing a communication channel with the external entity via one of BLE and NFC, the payment terminal is configured to disable (from attempting to establish communication with any other external entity) the other technique, until the initiated transaction is concluded.

In another embodiment, the payment terminal ceases to emit one of the two outputs as soon as it detects a signal return of the other of the two outputs. This may save battery power in a battery driven terminal.

In an embodiment, a communication channel with the payment terminal is established via NFC, wherein the user brings a card or an NFC enabled smartphone in proximity to the payment terminal. The payment terminal reads data from the card/NFC module of the phone and communicates it to the backend server to process the initiated payment transaction. Note that, the merchant is not instructing the payment terminal regarding which communication means to use, rather the payment terminal is automatically deciding on its own.

In an embodiment, a communication channel with the payment terminal is established via BLE, wherein the user brings a BLE enabled smartphone in proximity to the payment terminal. The payment terminal receives data from the BLE module of the phone and communicates it to the backend server to process the initiated payment transaction. Note that, even in this case, the merchant is not instructing the payment terminal regarding which communication means to use, rather the payment terminal is automatically deciding on its own.

In case of BLE, the payment terminal communicates transaction information (received from a backend server), such as amount deducted and balance in the user's account, to the user's smartphone via the communication channel established via BLE. Hence, the user is not only able to make payment, but also get an update on the transaction and account without using Internet or relying on SMS or similar alternatives.

Referring to FIG. 1, a system 100 for processing payments has a payment terminal 102 which can receive payments via external entities such as NFC enabled cards 104a and portable communication devices 104b. The payment terminal 102 in use communicates with a server 106 via a communication network 108.

The payment terminal 102 may be, for example, card readers, smartphones, POS systems, tablets, phablets, computers and laptops, among other computing devices.

Figure 2:
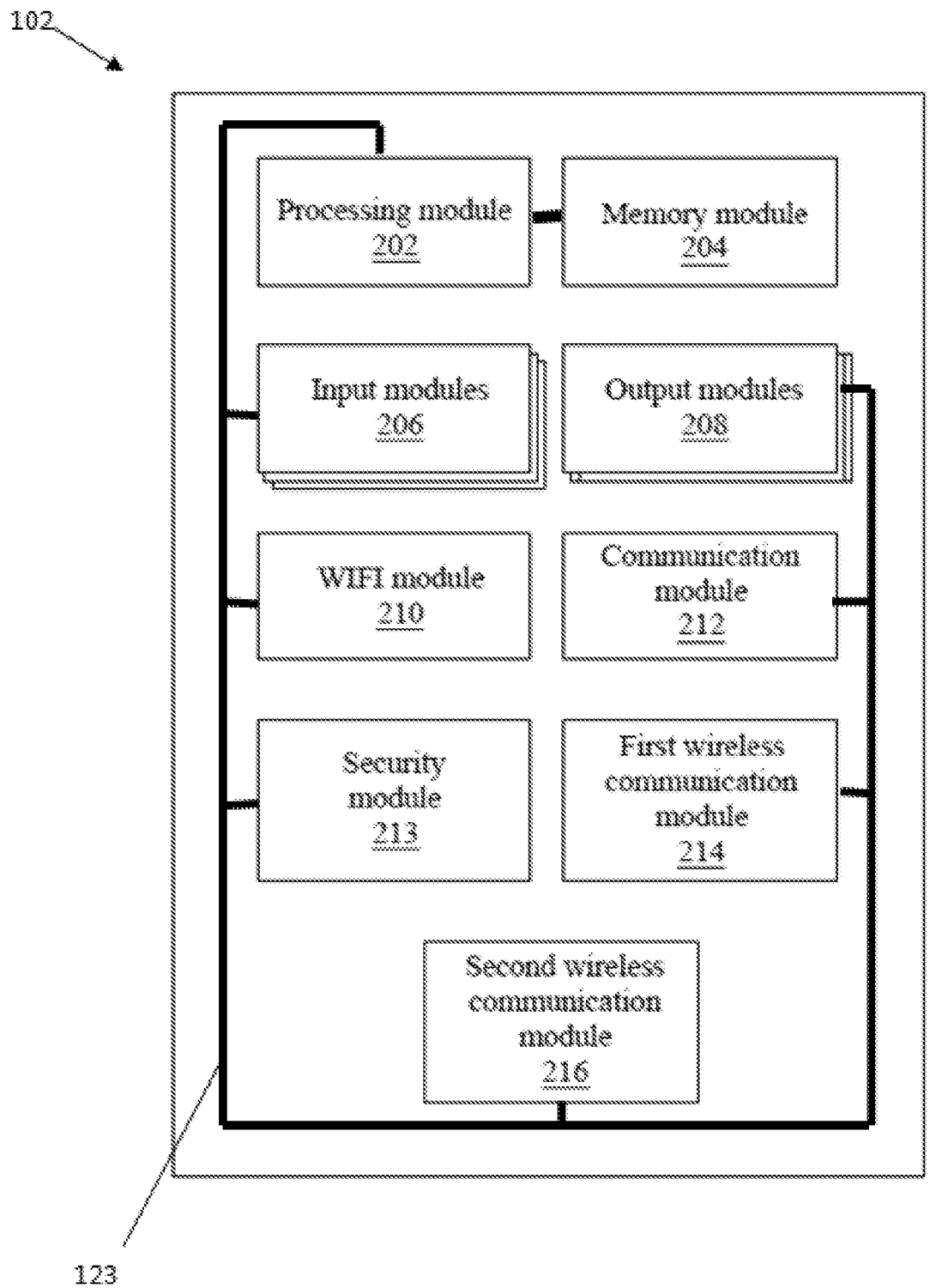
FIG. 2 is a block diagram of a payment terminal 102 of the system 100.

Now referring to FIG. 2, an embodiment of the payment terminal 102 includes a processing module 202, a memory module 204, input modules 206, output modules 208, a WIFI module 210, a communication module 212, a security module 213, a first wireless communication module 214 and a second wireless communication module 216. The memory module 204 is connected to a bus connecting it to the processor module 202. The processing module 202 is connected to all the other modules by a bus 123. The processing module 202 operates under the control of executable instructions stored in the memory module 204 to perform the functionality of the payment terminal 102, and in general calls the other modules of the device to perform their functionality.

Figure 6:
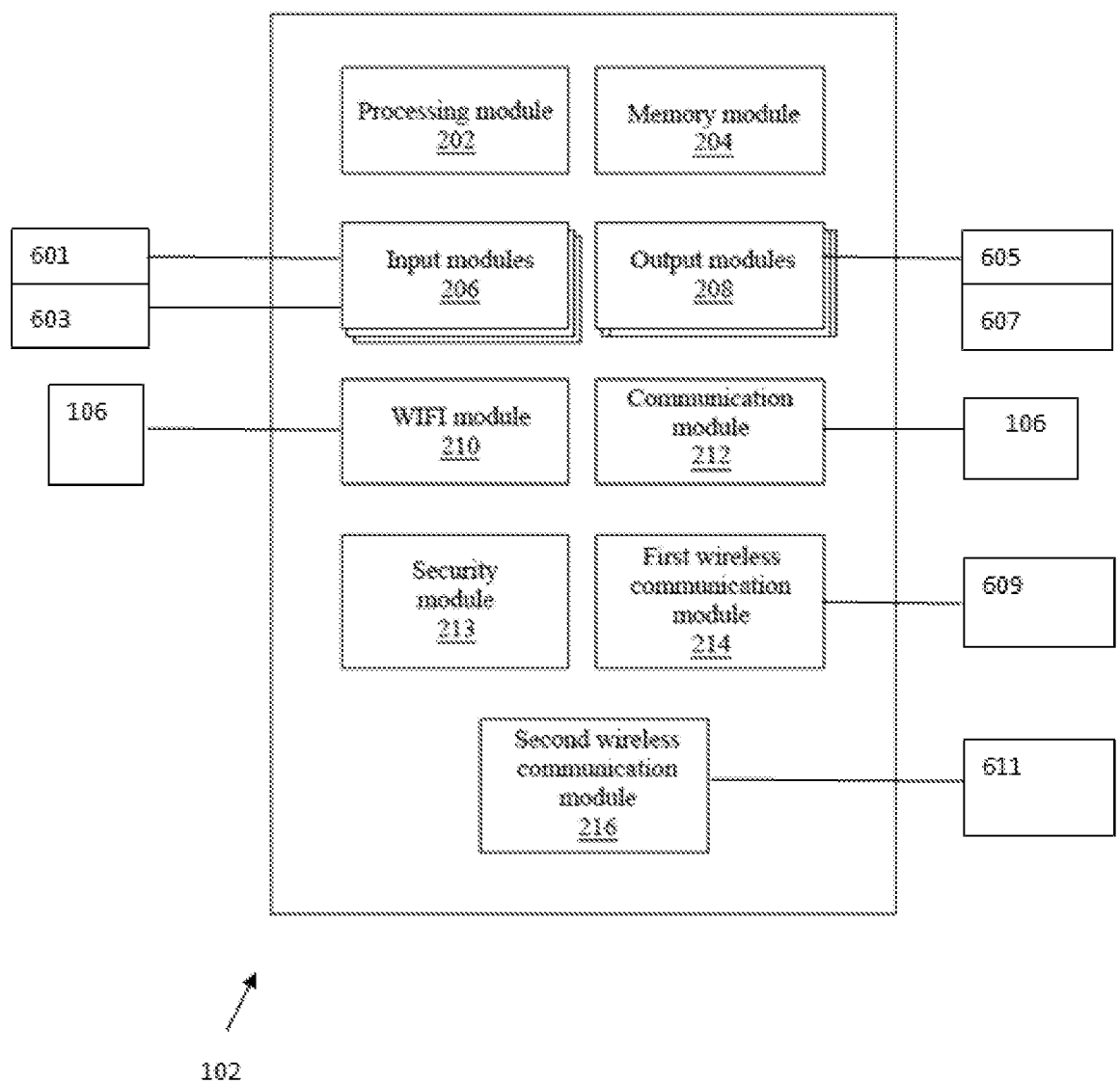
FIG. 6 shows a block schematic diagram of an embodiment of a payment terminal showing how some connections to the payment terminal may be carried out.

Referring now to FIG. 6, in this embodiment the input modules 206 are connected to a key pad 601 and stylus 603. The output modules 208 are connected to a display screen 605 and printer 607. The WiFi module is shown connected via a wireless link to the server 106, and the communications module 212 is shown connected via a wired link to the server 106. It will be understood that in use probably only one of the links to the server 106 will be employed. The first wireless communications module 214 is connected to an NFC antenna and the second wireless communications module is connected to a Bluetooth antenna 611. In some embodiments the antennas are integral with the respective wireless communication modules.

Returning to FIG. 2, the processing module 202 is implemented in the form of one or more processors and may be implemented as appropriate in hardware, computer executable instructions, firmware, or combinations thereof. Computer executable instruction or firmware implementations of the processing module 202 may include computer-executable or machine-executable instructions written in any suitable programming language to perform the various functions described.

In an embodiment the memory module 204 comprises a permanent memory such as hard disk drive, eMMC, SSD or EEPROM. The memory module may be configured to store data, and executable program instructions that are implemented by the processor 202. The memory module 204 may be implemented in the form of a primary and a secondary memory with primary memory being hard-wired memory and secondary memory being removable memory such as an SD card. The memory module 204 may store additional data and program instructions that are loadable and executable on the processor 202, as well as data generated during the execution of these programs. Further, the memory module 204 may be volatile memory, such as random-access memory and/or a disk drive, or non-volatile memory. The memory module 204 may comprise of removable memory such as a Compact Flash card, Memory Stick, Smart Media, Multimedia Card, Secure Digital memory, or any other memory storage.

In the presently described embodiment, the input modules 206 provide an interface for input devices such as keypad, touch screen, mouse, microphone and stylus among other input devices. The output modules 208 provide an interface for output devices such as display screen, speakers, printer and haptic feedback devices, among other.

In the presently described embodiment the input modules 206 and output modules 208 are also used to exchange data between the payment terminal 102 and data derived by the terminal from NFC enabled cards 104a, portable communication devices 104b with the server 106.

In one embodiment the WIFI module is used by the payment terminal 102 to communicate with the server 106 via the communication network 108.

In one embodiment, the communication module 212 is used by the payment terminal 102 to communicate with the server 106 via the communication network 108. In one embodiment the communication module 212 is a GPRS module. In other embodiments, other modules that enable telecommunication are employed.

In embodiments the communication module 212 includes a modem, a network interface card (such as an Ethernet card), a communication port, or a Personal Computer Memory Card International Association (PCMCIA) slot, among others. In one embodiment the communication module 212 includes devices supporting both wired and wireless protocols. In one embodiment data in the form of electronic signals are transferred via the communication module 212. In other embodiments one or more of electromagnetic, optical, among other signals are used.

In an embodiment, the payment terminal uses digital keys to encrypt decrypt and authenticate data exchanged between the terminal 102 and external entities 104. The keys in this embodiment are held in a security module 213. This security module houses all the keys that are to be used by the device, and is a one-time write only device. The keys are written into the security module 213 in a secure environment. The security module 213 is designed in such a way that keys cannot be directly read from the module. When encryption is required, data is pumped into the security module 213 which in turn returns encrypted data after processing using the keys. There is no way to access the keys directly from the security module 213, thereby ensuring safety of the keys. Likewise, to decrypt data, it is pumped into the security module 213 which processes it using the keys to return decrypted data.

The security module 213 may be deployed in the form of software, firmware, hardware or combination thereof.

In an embodiment, the first wireless communication module 214 is a personal area network module (hereinafter, referred to as module). In the presently described embodiment the PAN module a BLUETOOTH low energy (BLE) module. In other embodiments technologies that are analogous to BLE in the current context, may be used.

In an embodiment, the second wireless communication module 216 is a near-field communication module (hereinafter, referred to as NFC module). In other embodiments, technologies that are analogous to NFC in the current context may be used.

Therefore, it may be noted that the payment terminal 102 has the first wireless communication module 214, capable of establishing proximity communication with external entities 104, using a first communication channel or protocol (e.g., BLE) that is different from a second communication channel or protocol (e.g., NEC), which the second wireless communication module 216 is capable of establishing.

A high-level description will now be given of an embodiment of the payment terminal in operation with respect to FIGS. 2 and 6.

Initially a processor of the processing module 202 is in an idle state, and in this embodiment the two wireless communication modules 214, 216 are also idle. The terminal is "woken" by an input from the keypad 601 to its input module 206, which interrupts the idle process of the processing module 202 via bus 123. The processing module takes instruction over the bus 123 from the memory module 204, and processes this to provide an output over bus 123 to the first and second warless communication modules 214, 216, which thereby begin to emit their respective interrogation signals, i.e. BLE and respectively NFC signals, to seek out an external device 104. The interrogation signals are sent out via the respective antennas 609, 611.

When a response to one of the two interrogation signals is received by one of the two antennas 609 611, the respective wireless communication module calls the processing module 202 over the bus 123, and based upon stored instructions in the memory module 204, the processing module 202 instructs the other respective wireless communication module to cease emitting its interrogation signal. For simplicity, suppose first wireless communication module, BLE module 214, receives a response and thus second wireless communication module 216 is instructed to go to an idle state.

Data received from an external device 104 over antenna 609 is passed along bus 123 to security module 213 which decrypts that data under control of the processing module 202 using digital keys stored therein as described elsewhere in this document. This enables the payment terminal to authenticate the external device 104 (e.g. phone application or card). If appropriate, and after the authentication is performed some information is sent to screen 605 for display—for example instructing a user/merchant to perform an operation such as "input amount" "input pin".

The response to any such instruction is received by the input modules 206, for example an input made to the keypad 601. This is then processed by processing modules 202, and depending upon the outcome of processing either more information is displayed on screen 605 to facilitate further rounds of instructions and response, or the transaction information is sufficient for sending to the server 106.

In due course the processing module 202 instructs one of the WiFi modules 210 and the communication module 212 to interact with the server 106 on the basis of data received and processed by the terminal 102.

In response to the data received from the terminal 102 the server 106 returns data via one of the WiFi module 210 and the communication module 212. This data is processed by processing module 202 via bus 123 and if appropriate information derived from the data is displayed via the output modules 208 on the display screen 605 and/or printer 607.

At the end of the transaction the processing module returns to its idle state.

At some time during the processing of the transaction the terminal 102 may send data to the external device 104, typically such data being encrypted by keys stored in the security module 213. As described elsewhere data sent to the external device may comprise, for example, a one-time code for security purposes.

In FIGS. 3A-3F, the tasks carried out by one embodiment of the payment terminal 102, the external entity 104 (types of external entities 104a, 104b are referred to as external entity 104 in some instances to facilitate easier reading of this document) and the server 106, are discussed.

Figure 4A:
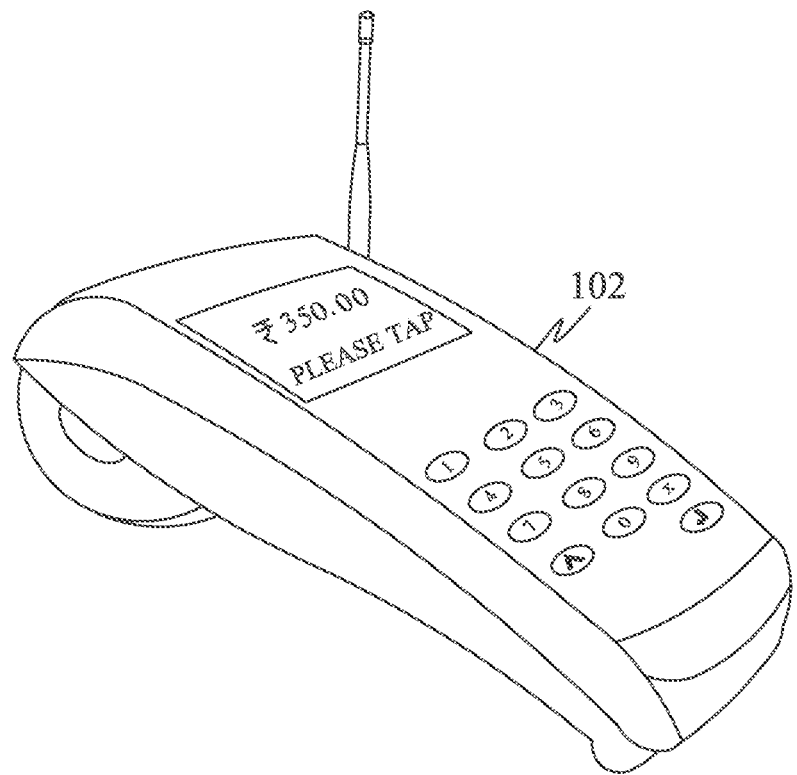
FIG. 4A illustrates an amount entered in the payment terminal 102.

At step 302, the payment terminal 102 receives an input indicating amount to be charged. As an example, merchant uses a physical or digital keypad provided in or on the payment terminal 102 to receive the input indicating the amount to be charged. As an example, referring to FIG. 4A, the merchant has entered an amount of Rs. 350, which the merchant intends to receive from the user/customer.

At step 304, the payment terminal 102 receives an input to initiate a transaction with the external entity 104. As an example, again referring to FIG. 4A, after entering the amount, the user of the payment terminal 102 presses the return key to provide the instant input. It may be noted that, pressing of the return key may be interpreted as a confirmation of the amount discussed in the previous step, and the input discussed in the current step.

At step 306, in response to the initiation input, the payment terminal 102 (e.g. processing module 202 of the payment terminal 102) causes the first wireless communication module 214 (hereinafter referred to a BLE module 214 to facilitate easier reading of this document) and the second wireless communication module 216 (hereinafter referred to a NFC module 216 to facilitate easier reading of this document) to attempt to establish communication with an external entity 104. As an example, both the modules 214, 216 may be switched on in response to the initiation input and thereafter attempt to establish the communication channel. Alternatively, both the modules 214, 216 may already be on (but in "sleep" or "power saving" mode), but at this instance, begin attempting to initiate and thus establish the communication channel with the external entity 104.

At step 308, both the BLE module 214 and the NFC module 216 attempt to establish the communication channel. As an example, in the case of the BLE module 214, the BLE module 214 may begin broadcasting its identifier. On the other hand, in case of NFC module 216, the NFC module 216 generates electromagnetic field. It may be noted that, the merchant is not specifying which of the modules 214, 216 should be used, rather the payment terminal 102 is configured to use both the modules 214, 216 to attempt establishing of a communication channel, and, in due course after authentication establish the communication channel via one of the suitable modules 214, 216.

Figure 3A:
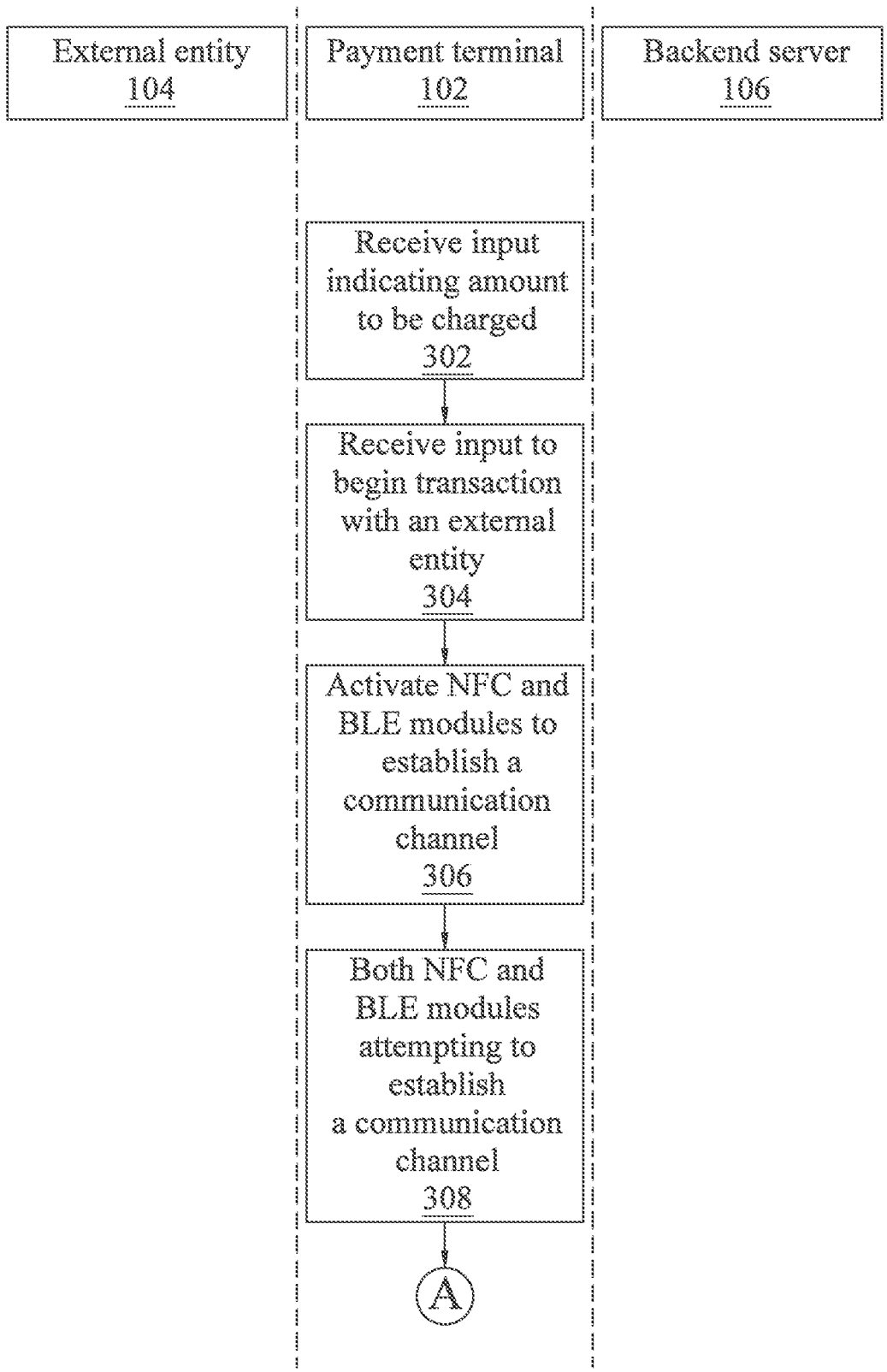
FIGS. 3A-3F, are flow charts of an exemplary method of processing payments by the system 100.
Figure 3B:
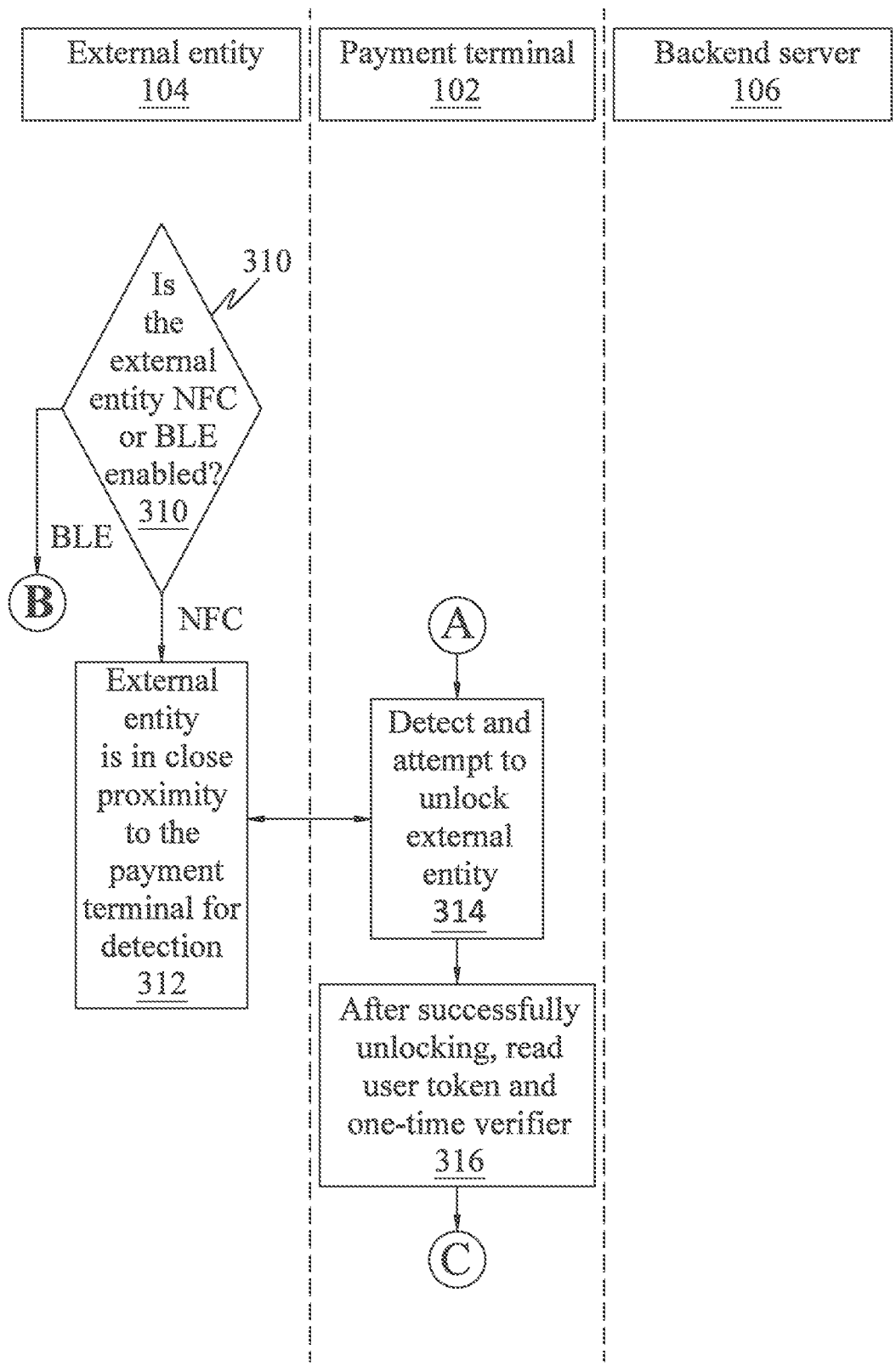
Figure 3C:
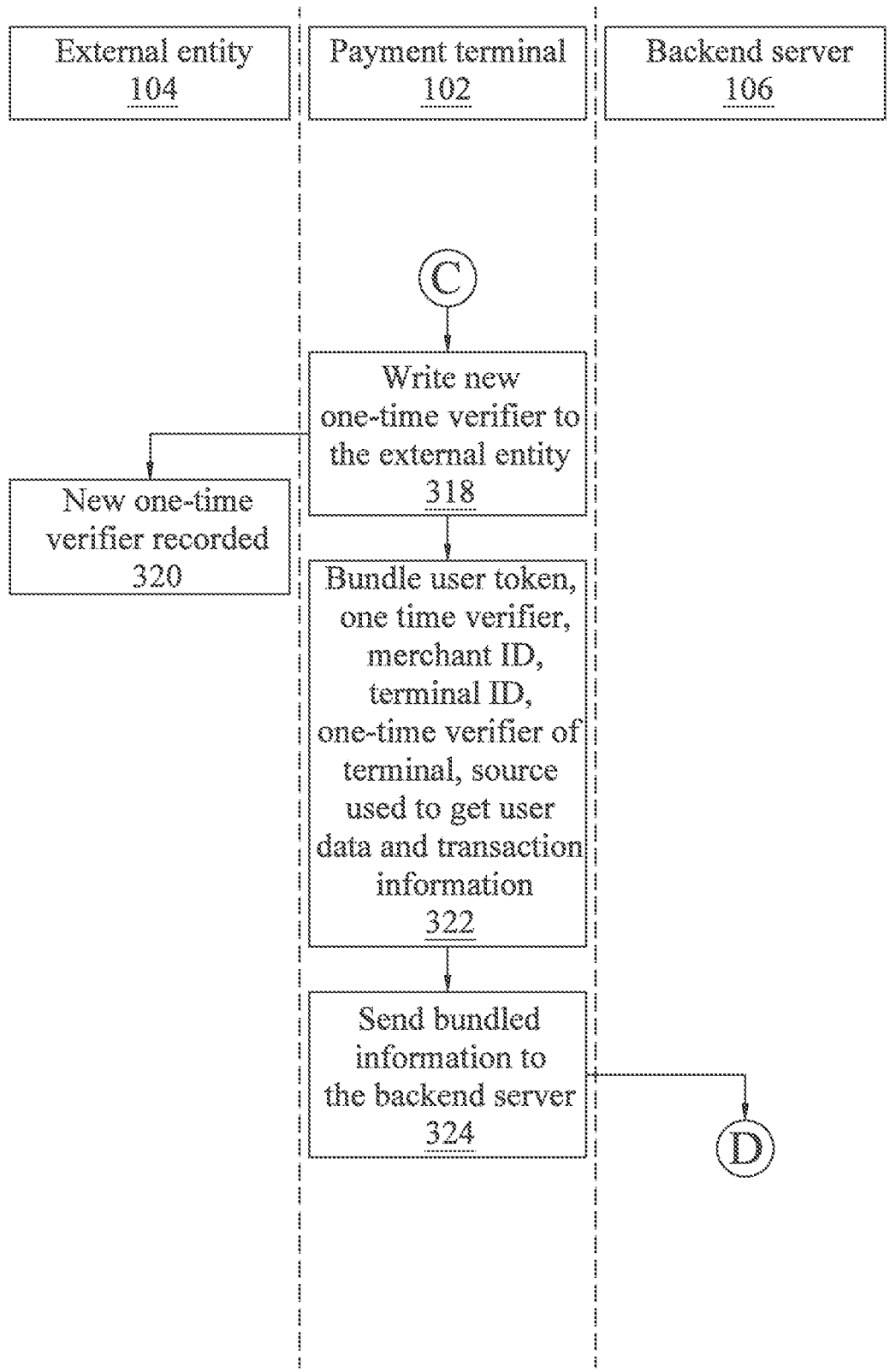
Figure 3D:
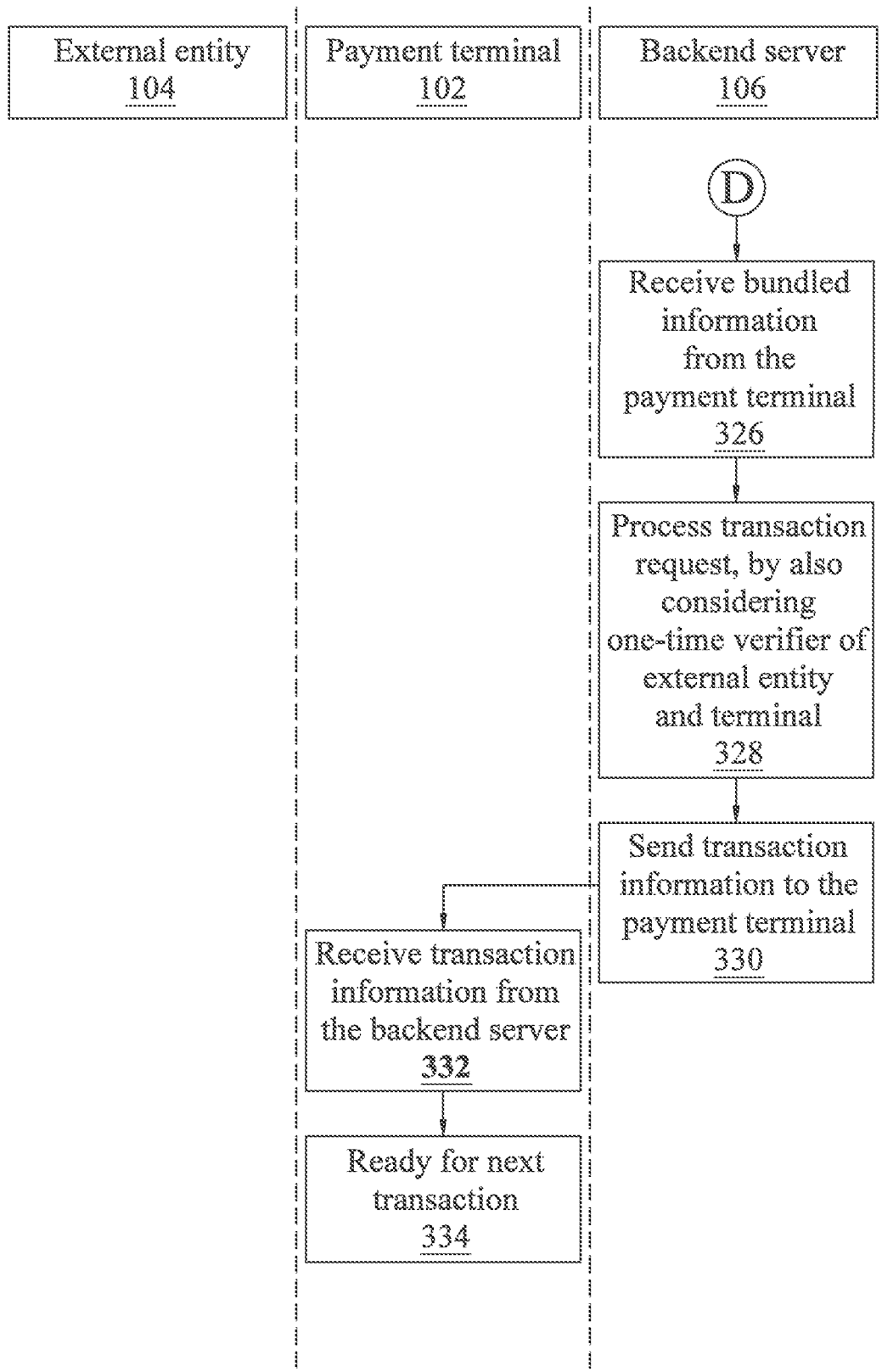

Referring to the step 310 in FIG. 3B, it may be noted that, although it appears as if the external entity 104 is deciding whether the external entity 104 is NFC or BLE enabled, it would be well understood that the step 310 is presented only for the sake of explanation. It may be appreciated that, external entity 104, as discussed earlier, may be a NFC enabled card 104a (such as credit card, debit card, access card, corporate card or food card) or a portable communication device 104b (e.g., smartphone) with one or more of BLE or NFC capabilities. We will discuss the transaction flow in case of BLE enabled portable communication device 104b later. Now we discuss a scenario wherein the external entity 104 is a NFC enabled card 104a or a NFC enabled portable communication device 104b. It may be noted that, in case of portable communication device 104b with NFC and BLE capabilities, which one of those should be used may be defined by default application settings, user defined settings in the application or availability of the module.

Referring to step 312, external entity 104 is in close proximity to the payment terminal 102 for detection. As an example, once the merchant has the payment terminal 102 ready to accept payment, the user/customer may bring the NFC card 104a or NFC device 104b close (to the extent required for NFC) to the payment terminal 102.

By way of explanation, in some embodiments the NFC card/device 104a, 104b carries encrypted data so that only the payment terminal 102 of the embodiment can interact correctly with the NFC card/device of the embodiment. This gives rise to a phenomenon known as "locking" the card/device.

Referring to step 314, the payment terminal 102 detects and attempts to unlock external entity 104 by authenticating it. Once authentication has been successfully carried out, a communication channel becomes established; that is, only after authentication has been successful will transaction data be sent.

Therefore, after detecting the NFC card 104a or NFC device 104b, the payment terminal 102 has established the communication channel with the external entity 104 using one of the first wireless communication module 214 and the second wireless communication module 216, based on which one of the communication modules 214, 216 is successful in initiating the communication channel with the external entity 104. In this case, payment terminal 102 has established the communication channel with the external entity 104 using the second wireless communication module 216 (NFC module 216). Hence the communication channel thus established may be referred to as NFC channel.

In the present embodiment, once a response to one of the BLE and NFC signals is received the payment terminal 102 terminates any attempt to establish communication channel with any other external entity using the first wireless communication module 214 and the second wireless communication module 216 until the said transaction is concluded.

In another embodiment, upon establishing a communication channel, that is not only receiving a response to the output signal from the payment terminal but also authenticating the external device so data communication may start, the payment terminal terminates the other, non-responded to communication module from further outputs until the present transaction is concluded.

Using the NFC channel that is established, the payment terminal 102 coordinates with the external entity 104 to unlock external entity 104. Known (or that may be developed in future) security technologies deployed at the card/device level and at the payment terminal 102 may be used for unlocking the NFC card 104a or NFC device 104b. In case the payment terminal 102 fails to unlock, then the transaction is, in the present embodiment, terminated (transaction concluded).

Referring to step 316, once unlocking is successful, the payment terminal 102 reads a user token from the card memory. The user token is data identifying a user attempting to make a payment connected to the transaction, analogous to a card number on a credit card.

In one embodiment, in addition to reading the user token, the external entity 104 stores data that is used as a one-time verifier. In this embodiment the stored one-time verifier is also read by the payment terminal 102 to improve security.

The one-time verifier may be understood as data unique for each transaction that is attempted. It may be further noted that, in case of NFC card 104a, a new onetime verifier may be written to the card 104a each time the existing one-time verifier is read by a payment terminal 102 to process a transaction. It may be further noted that, some smartphone may not allow writing this data to its NFC module, in which case the provision of one-time verifier as implemented in the foregoing example may not be provided.

Figure 5A:
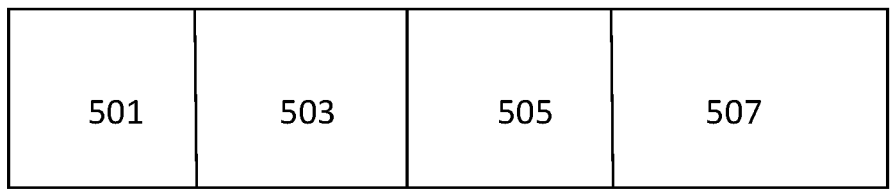
FIG. 5A shows a highly schematic diagram of an exemplary transaction packet.

By way of explanation, referring to FIG. 5A, a transaction data packet 500 typically contains customer token 501, customer identifier 503, transaction amount 505 and merchant ID 507. If a hacker were able to sniff data when a user paid or tried to pay a bill for at a terminal, then it is possible that the hacker could can pay the same amount at the same terminal multiple times. This is referred to sometimes as a "replay attack". So, it is desirable to differentiate between legit transactions and replay attacks.

Figure 5B:
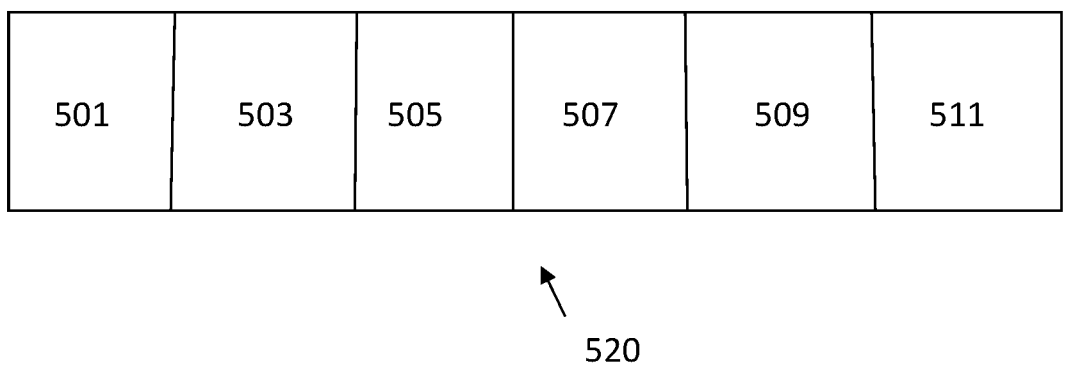
FIG. 5B shows another transaction packet.

In the present embodiment there is a safety mechanism in place to detect 'replay attacks'. In replay attacks, a hacker sniffs the data being exchanged between two devices and replays the same multiple times. In order for the system to be able to detect and flag such attacks, it is necessary to introduce something fresh into the data packet every single time. In the embodiment, see FIG. 5B, this is achieved in one or both of a) maintaining and increment a counter on the card after each transaction, and b) sending the time stamp on the payment device as part of the data packet.

Thus, the packet 520 of the embodiment not only includes customer token 501, customer identifier 503, transaction amount 505 and merchant ID 507, but also the counter-number 509 stored on the card/device and also the time stamp 511 of the transaction.

In an embodiment, the data read from the NFC card 104a or NFC module of a mobile device 104b (or data communicated via BLE) includes data that enables the payment terminal 102 to identify whether the data it is gathering is from a NFC card 104a or a NFC module of a mobile device 104b (or via BLE of a mobile device). Therefore, the payment terminal 102 (or the server 106, or both) is capable of identifying whether the communication established is with one of a near field communication tag of the card 104a, a near field communication module of the portable communication device 104b or a personal area network module 214 of the portable communication device 104b. It may be noted that, such a provision enables the server 106 establish the data sets that are required to process the transaction. As an example, in case of NFC card 104a, a one-time verifier is required, whereas in case of NFC module from a mobile device 104b, the one-time verifier may not be required (due to the constraints discussed earlier) to process the transaction.

In an embodiment, the data read from the NFC card/device 104a, 104b or received via BLE includes location validation data. In other words, the payment terminal 102 receives location validation data from the external entity 104. The location validation data is used to verify whether payment can be accepted using the payment terminal 102.

In one embodiment data is written to the external entity 104, e.g. card 104a, and terminals are set to reject cards carrying that code except where the terminal is at the venue of concern. At completely closed group payments environments like a corporate canteen, where the payment device is expected to accept payments from only one corporate(s), the check is done locally at the payment device level itself. If the device does not find the customer card populated with a specific identifier (identifying the corporate) then transaction is declined right away. A server call is not required).

In case it is determined that payment cannot be accepted, then the transaction is declined. On the other hand, if verified that payment can be accepted, then the transaction is processed. The verification that is being discussed may be carried out by the payment terminal 102.

Alternatively, the verification can be carried out by the server 106, or both.

In other cases where the payment devices are located in general retail, the check happens at the server 106. The customer identifier is also part of the data packet that is sent to the server. A rule is set at the back end that prohibits customers with a particular customer identifier from paying at a certain location (e.g. identified by merchant ID 507 which, it will be recalled, is also part of the transaction data packet).

As an implementation example, a company may have issued NFC cards 104a to its employees for use within the food court deployed in their campus. In case the card 104a is used to make a payment at a payment terminal 102 outside the campus, the payment terminal 102 (or server 106), upon reading the location validation data, may decline the transaction.

Now referring to step 318, the payment terminal 102 writes a new one-time verifier to the external entity 104. As an example, the new one-time verifier is written to the NFC card 104a. In case NFC module of the mobile device 104b allows such writing, then even in case of NFC enabled mobile device 104b, the new one-time verifier is written to the NFC module of the mobile device 104b in an embodiment. The new one-time verifier is used for the next transaction. The new one-time verifier may be a per-configured increment/decrement in comparison to the existing one-time verifier. Alternatively, the one-time verifiers may be a randomly generated code, which may be based on known logic. In an embodiment, the new one-time verifier is generated by the payment terminal 102. At step 320, the new one-time verifier is recorded in the NFC card 104a or NFC module of the mobile device 104b (if 1 such provision is provided).

It should be noted that, the one-time verifier adds freshness to the data gathered from the external entity 104 for each transaction. As an example, in case only user token was to be gathered (as done conventionally), which is also constant, then a rogue system with access to the user token can misuse the user token to carryout transactions.

Referring to step 322, the payment terminal 102 bundles the user token, one-time verifier (if any), merchant ID, terminal ID, one-time verifier of payment terminal 102, source (NEC card/mobile or BLE) used to get user data and transaction information. In an embodiment, the payment terminal 102 may bundle the new one-time verifier as well. It may be noted that, apart from the one-time verifier corresponding to the external entity 104, there can be a one-time verifier for the payment terminal 102 as well. Hence, a rogue system with information (e.g., merchant ID or terminal ID) about the payment terminal 102 may still be presented with resistance in case of misuse. In an embodiment, the user may have to communicate a PIN as well to the payment terminal 102 to authorise the transaction. In some embodiment, PIN may be required only for transactions beyond a certain preconfigured amount.

Additionally, the payment terminal 102 may bundle authentication and security data along with other data to enhance the security features.

Referring to step 324, the payment terminal 102 sends the bundled information to the server 106. The payment terminal 102 may use WIFI module 2 to send the information to the server 106. Alternatively, the payment terminal 102 may use GPRS module to send the information to the server 106. Alternatively, the payment terminal may encrypt the bundled information using the security module 213 for security purposes before communicating it to the server 106.

Referring to step 326, the server 106 receives the bundled information from the payment terminal 102.

Referring to step 328, the server 106 processes the transaction. The conventional steps involved in processing the transaction are not discussed, to prevent obscuring attention from steps that may be unconventional. The onetime verifier of the external entity 104 and one-time verifier of the payment terminal 102 are used to decide whether the payment request should be declined or further processed. The one-time verifier (corresponding to payment terminal 102) is used to verify whether the one-time verifier is what is expected from the payment terminal 102 for the current transaction to either reject the transaction or proceed with the transaction. Likewise, the one-time verifier (corresponding to external entity 104) is used to verify whether the one-time verifier is what is expected from the external entity 104 for the current transaction to either reject the transaction or proceed with the transaction.

In an embodiment, the payment terminal 102 may even communicate the new one-time verifier corresponding to the external entity 104 to the server 106, so that the server 106 knows what to expect from the external entity 104 in the next transaction.

In an embodiment, the new one-time verifier of the external entity 104 or the payment terminal 102 is a known change compared to the previous one-time verifier. Hence, the e server 106 may just have to verify the one-time verifier with the previous one to either decline or proceed with the transaction.

In an embodiment, the server 106 communicates a new one-time verifier for the payment terminal 102 for use in the next transaction.

In case of absence of one-time verifier from the external entity 104, where it was expected, or wrong one-time verifier, the server 106 may block the external entity 104 from carrying out transaction, till the issue is resolved. Likewise, for the payment terminal 102.

Referring to step 330, the server 106 sends transaction information to the payment terminal 102. The transaction information may include information corresponding to successful payment or payment being declined. The transaction information may also include information corresponding to the amount being credited to the merchant's account and/or selected information about the user/customer who made the payment, among other information.

Referring to step 332, the payment terminal 102 receives the transaction information from the server 106. Some of the information that is received may be outputted (e.g., display) by the payment terminal 102. In some embodiments, some of the transaction information may be prevented from being outputted by the payment terminal 102, whereas such information may be outputted on the external device 104 (e.g., phone).

Referring to step 334, once the transaction is concluded, the payment terminal 102 may be ready for the next transaction (e.g., start at 302).

Now referring to block 310, as may be recollected, we had previously provided the description considering that the user/customer may be using a NFC card 104a or NFC enabled smartphone 104b to make payment. Now we refer to a scenario wherein the user is using a portable communication device 104b (e.g., smartphone) with BLE capabilities to make the payment.

It should be understood that BLE is not essential to the invention, and other protocols would also work, for example "normal" Bluetooth or WiFi.

Figure 3E:
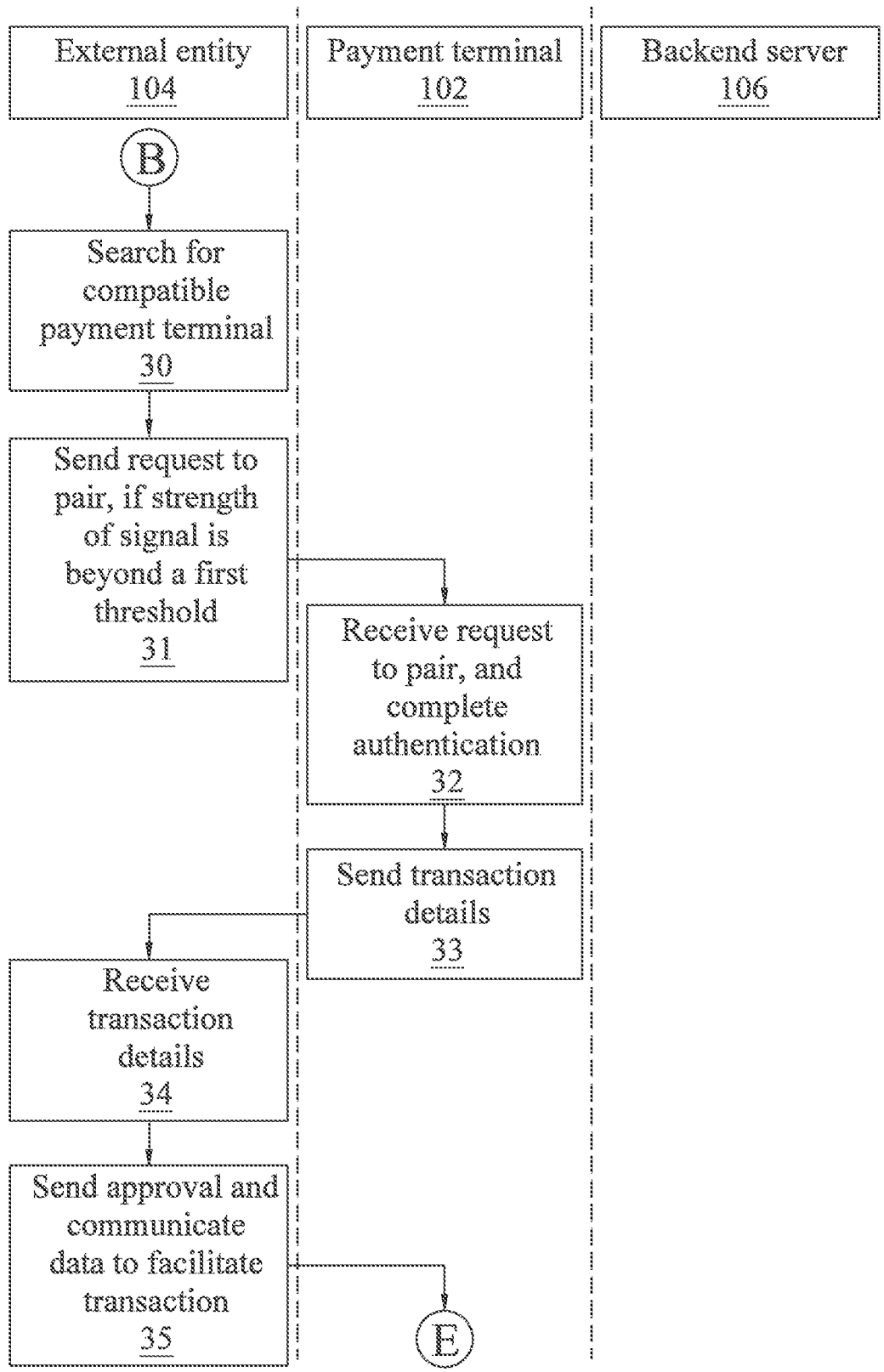

We may now also refer to FIG. 3E, along with other figures in the FIG. 3 series. As explained earlier, with reference with step 308, both NFC module 216 and BLE module 214 of the payment terminal may be attempting to establish a communication channel. As explained earlier, in the case of the BLE module 214, the BLE module 214 may begin broadcasting its identifier. The identifier may comprise data identifying compatibility.

Figure 4B:
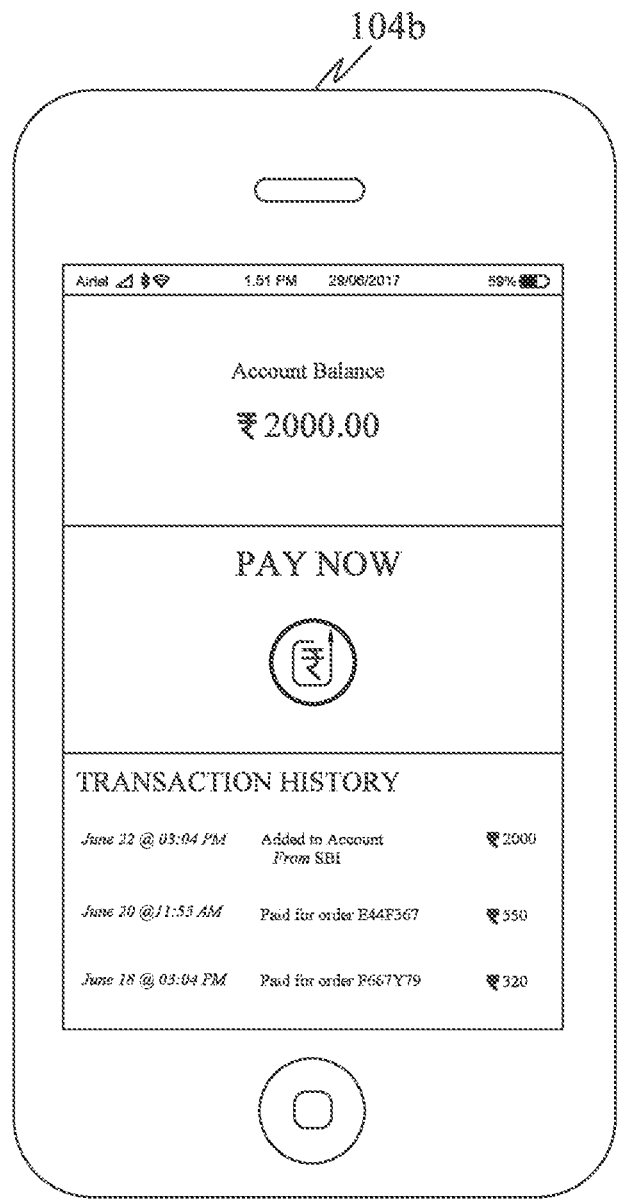
FIG. 4B illustrates a user interface of an application of a smartphone 104*b* that is opened by the user to make payment.
Figure 4C:
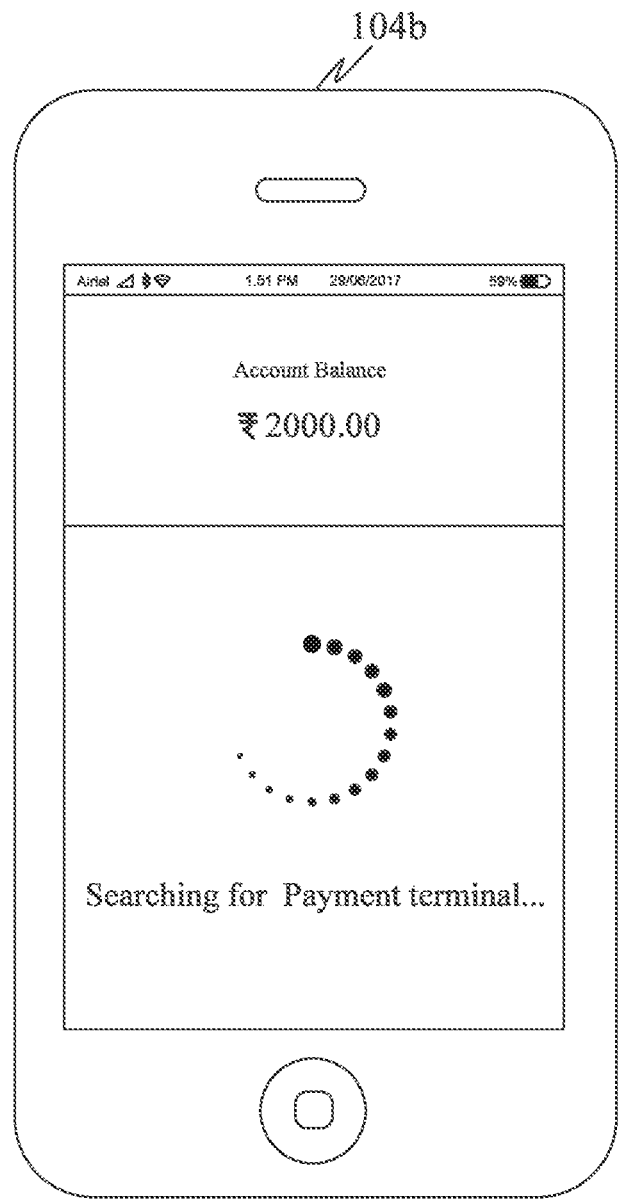
FIG. 4C illustrates a user interface of the application of the smartphone 104*b* searching for payment terminals 102.

As an example, referring to FIG. 3E and FIG. 4B as well, the user opens a payment application in the portable communication device 104b and activates "pay now" icon. The application causes the BLE module of the BLE-enabled smartphone 104b to search (refer FIG. 4C) for payment terminals 102.

In an embodiment where there are plural payment terminals, the payment terminals typically radiate signals at the same strength, but of course it is highly unlikely that two terminals will be equidistant from any particular portable communication device (smartphone). The radiation of signals to indicate readiness to connect (pair) is sometimes referred to in the art as "advertising" and consists typically of emitting packets of data. The term "pair" is not intended to be restrictive.

The signal strength received at the portable communication device (smartphone) is measured by the smartphone, for example by the application running on the smartphone, and used to determine the position of the smartphone relative to each of the payment terminals available in the vicinity.

As the first step of pairing, step 30, FIG. 3E, the application scans the vicinity and makes a list of 'eligible candidates' that it can establish a connection with. The application is configured to ensure that the portable communication device (smartphone) only pairs with the intended payment terminal. Say for example, a merchant asks the customer to open the application and bring the phone close to payment terminal-A to initiate payment. The application then takes over and determines which payment terminal (among all the eligible payment terminals) is located closest to it. Since the merchant has asked the customer to bring their phone close to payment terminal-A, the application will see that payment terminal-A is only a few inches away whereas the others a few meters away and hence will request to pair with payment terminal-A.

The signal strength logic (establishing connection with the closest available payment terminal) is used ONLY to establish connection.

Once the phone pairs with the payment terminal and hence establishes a connection, the connection remains active up to the point when the application decides to cut off the connection. The connection remains active even when the phone is pulled back away from the terminal and the application continues to talk to the terminal to complete the transaction. Once the application determines that the transaction is complete, the application disconnects and releases the terminal.

The terminal is configured such that it cannot be paired with 2 phones simultaneously. Once a phone is paired or connected to the terminal, the communication channel between phone and terminal is exclusive. That is, no other phone can pair with or otherwise communicate with the terminal. The terminal is effectively locked to that phone and can only be unlocked (disconnected from the phone) by the application OR by physically resetting the payment terminal.

In an embodiment this "locking" is carried out by the terminal being configured to stop advertising when pairing takes place. In one example, the application on the smartphone issues an instruction to the terminal to stop advertising; in another example the terminal is configured to cease advertising without input from the smartphone as soon as pairing has taken place.

The processor of the payment terminal receives this instruction, and in response to stored instructions processes it and disables temporarily the advertising of its ability and presence to pair.

In an embodiment, the application of the smartphone 104b looks for compatible payment terminals 102 by looking at the data identifying compatibility present in the identifier. For example, there may be several BLE or BLUETOOTH devices that may be advertising, however, the application is only interested in identifying payment terminals 102 which may be considered for making payment (therefore be considered for sending a request to pair).

The user having moved the portable communication device proximate to a payment terminal so that signal strength is above the first threshold, as shown at FIG. 3E, step 31, the smartphone 104b sends a request to that payment terminal 102 to pair.

In one embodiment the request to pair is only sent out, if strength of signal from the payment terminal 102 is above a first threshold.

In another embodiment, the request to pair is sent out as soon as the user activates the "pay now" icon, or similarly instructs the smartphone to commence a transaction.

In a further embodiment, the application displays an indication of one or more terminals to which pairing is possible for example on its display screen, and the user selects one of these, the selection causing a request to pair sequence to initiate.

As an example, consider a merchant location with multiple compatible payment terminals 102. The application of the smartphone 104b would identify and shortlist all of these payment terminals 102, however it has to decide to which one among those a request to pair has to be sent.

In an embodiment, even in a scenario wherein a single payment terminal 102 is identified, the request to pair is not sent unless the signal strength is above the first threshold. In practice, the user experience would be similar to "tap-and-pay" even when using BLE as a channel to make payment. The user takes the smartphone 104b close (refer FIG. 4D) to the payment terminal 102 resulting in increase in the signal strength, and thereby causing the application to request pairing with the payment terminal 102. Hence, it is to be understood that the smartphone 104b sends a request automatically to establish a communication channel with the personal area network module 214 of the payment terminal 102, if signal strength of the broadcasted identifier is over the first threshold.

The first threshold is configured such that the portable communication device 104a and the payment terminal 102 are within a preconfigured distance of each other to establish the communication channel. The first threshold may be reconfigured remotely via a software update, or may be configured at the payment terminal 102.

In an embodiment, the first threshold is configured such that the portable communication device 104b and the payment terminal 102 are within approximately 20 centimetres of each other to establish the communication channel.

In another embodiment, the first threshold is configured such that the portable communication device 104b and the payment terminal 102 are within approximately 10 centimetres of each other to establish the communication channel.

It is to be understood that, with the configuration of the first threshold, we are able to set an approximate distance between the portable communication device 104b and the payment terminal 102 to proceed with pairing.

At FIG. 3E, step 32, the payment terminal 102 receives the request to pair. The payment terminal 102, on receiving the request, co-ordinates with the smartphone 104b using well known protocol, to successfully pair or decline request. In case pairing is successful, the payment terminal 102 has established the communication channel (BLE channel) with the external entity 104 using the first wireless communication module 214 (BLE module 214). Hence the communication channel thus established may be referred to as BLE channel.

Once communication channel is established (paired), the smartphone continues to retain communication with the personal area network module of the payment terminal 102 if signal strength between the smartphone 104b and the personal area network module 214 of the payment terminal 102 falls below the first threshold. In practice, the user brings the smartphone 104b close to the payment terminal 102, causing the smartphone 104b to pair with the payment terminal 102. Thereafter, the user may pull back the smartphone 104b, but communication channel will be retained improving the user's experience and making the transaction process more reliable.

In an embodiment, at least one of the payment terminal 102 or the smartphone 104b is configured to terminate the established communication channel, if the signal strength in the channel between the smartphone 104b and the personal area network module 214 of the payment terminal 102 falls below a second threshold. The second threshold may be controllable. The second threshold may be reconfigured remotely or at the device.

At FIG. 3E, step 33, the payment terminal 102 sends transaction information to the smartphone 104b. The information is sent via the BLE channel. Such information may include amount to be transferred and merchant information, among others.

Figure 4D:
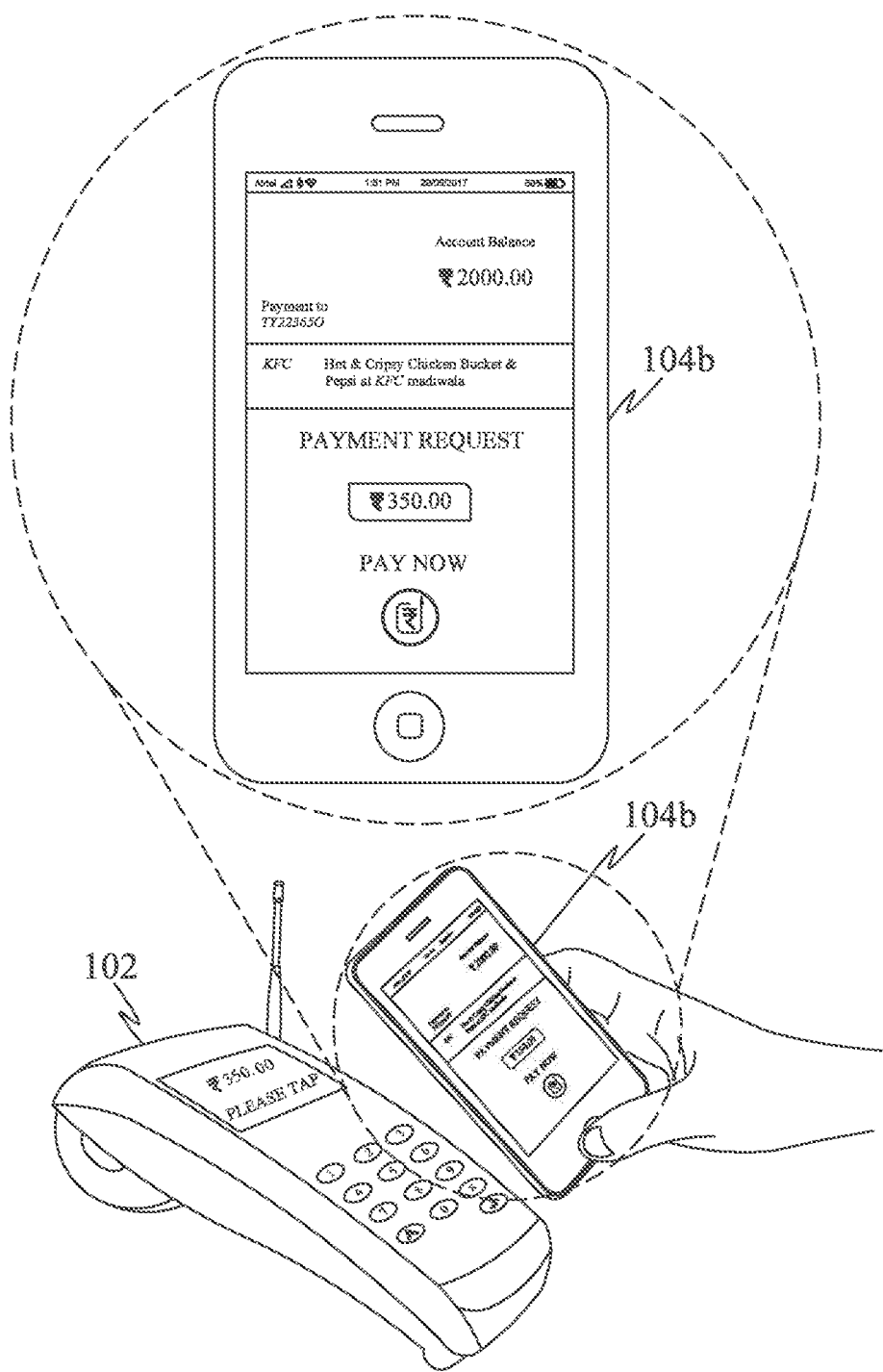
FIG. 4D illustrates a smartphone 104*b* paired with the payment terminal 102 via BLE channel after having the smartphone 104*b* brought close to the payment terminal 102.
Figure 4E:
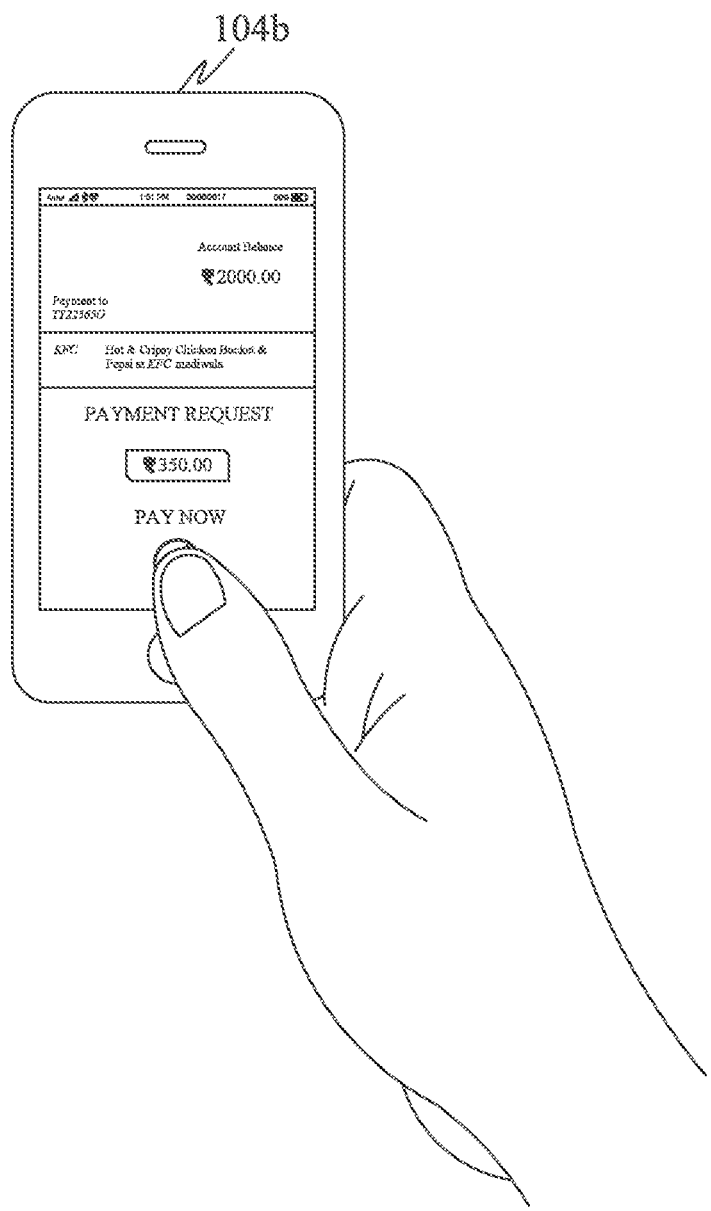
FIG. 4E illustrates a user interface of the application of the smartphone 104*b*, where the user is providing input to approve payment.
Figure 4F:
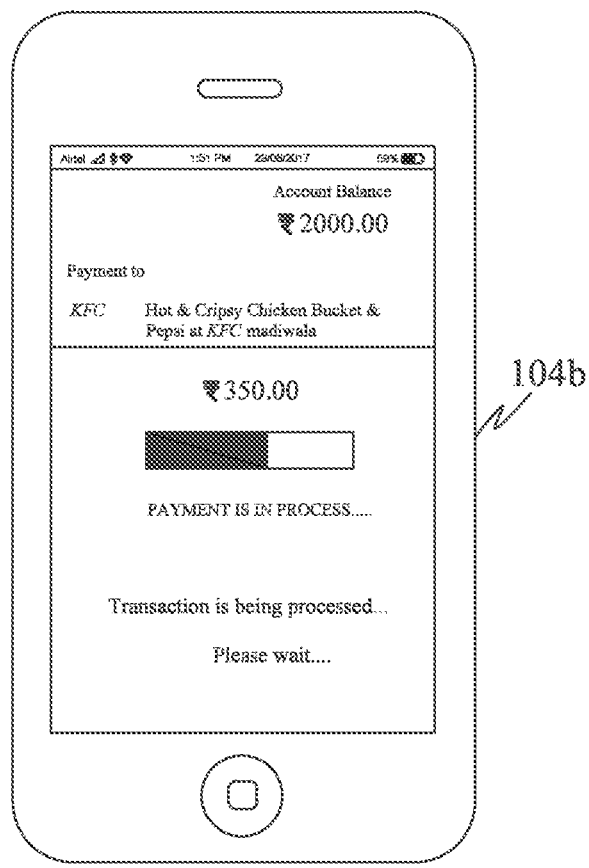
FIG. 4F illustrates a user interface of the application of the smartphone 104*b*, where it is shown that the transaction is being processed.
Figure 4F:
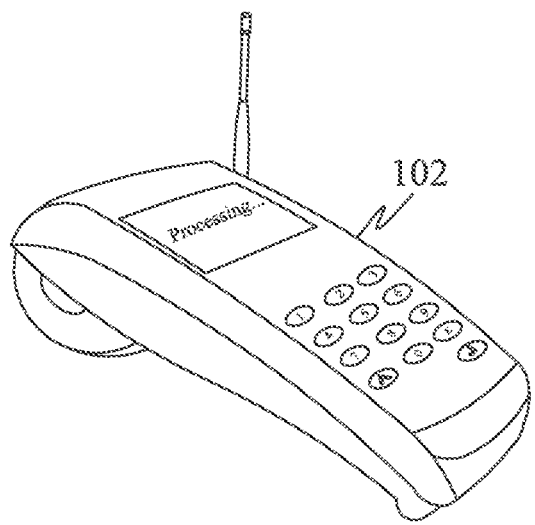

At FIG. 3E, step 34 and FIGS. 4D and 4E, the smartphone 104b receives the transaction information sent by the payment terminal 102.

At FIG. 3E, step 3 and FIG. 4E, the user may activate an icon, thereby causing the smartphone 104b to send approval for payment and communicate data to facilitate the transaction. The data that is communicated (in addition to relevant data that was discussed in the context of NFC) may include real time data as well. Real time data may include data corresponding to time. The one-time verifier may be generated by the smartphone 104b. In an embodiment, the user may have to communicate a PIN as well to authorise the transaction. In some embodiment, PIN may be required only for transactions beyond a certain preconfigured amount.

Figure 3F:
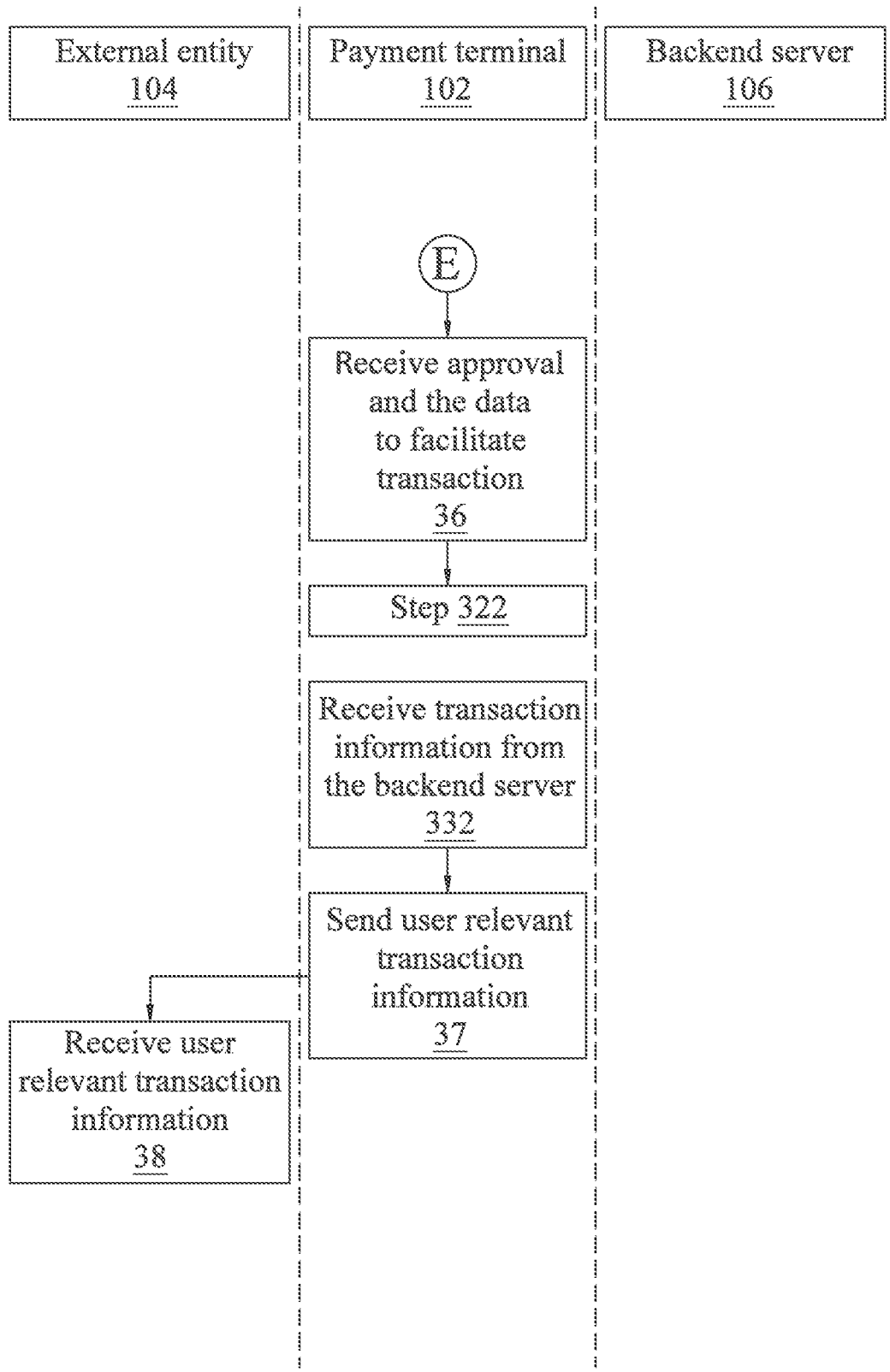

At FIG. 3F, step 36, the payment terminal 102 receives the approval and the data, and steps discussed earlier in connection with step 322 and subsequent steps may be carried out, as may be adapted for this mode of transaction.

Figure 4G:
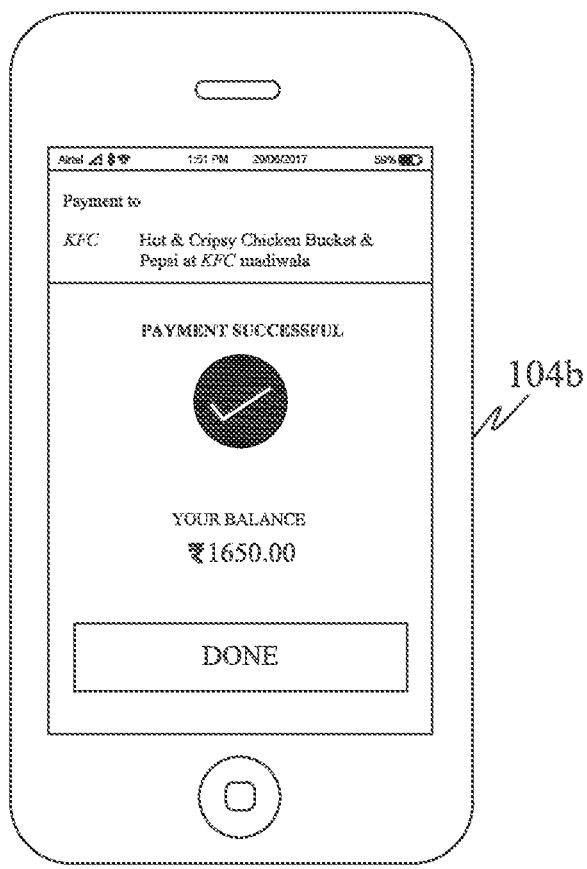
FIG. 4G illustrates a user interface of the application of the smartphone 104*b*, where transaction information is displayed after successful transaction.
Figure 4G:
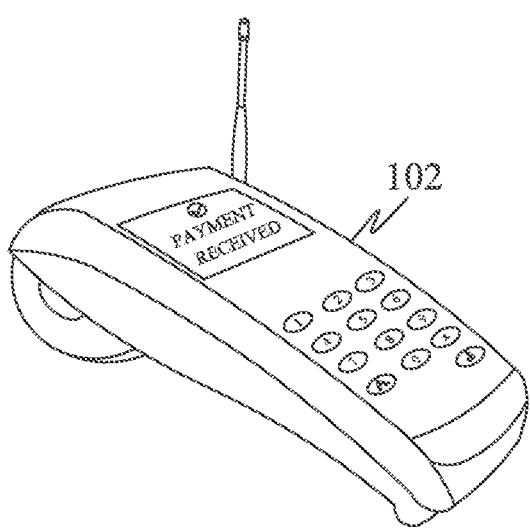

Now specifically referring to the steps 332 (FIG. 3D), 37 and 38 (FIG. 3F), the payment terminal 102 receives transaction information from the server 106. It may be noted that, as discussed earlier, the server 106, based on the data received knows that the data was received by the payment terminal 102 via BLE channel. Hence, the BLE channel can be used to provide an update, corresponding to the transaction, to the user. Therefore, apart from the typical data sent by the server 106, the server 106 sends and the payment terminal 102 receives data corresponding to the account balance of the user making a payment using the smartphone 104b. The payment terminal 102, via the BLE channel, communicates the data corresponding to the account balance to the smartphone 104b (refer FIG. 4G). Therefore, the user is not only able to make the payment without using the Internet, but also get an update on the transaction, without using the Internet.

Having completed step 38, the application running on the smartphone 104 sends a command over the communication channel with the payment terminal 102. This command instructs the terminal to start advertising so that further transactions with other smartphones is possible. The command is received by the payment terminal and is processed by the processing circuitry of the payment terminal in accordance with instructions stored in memory of the terminal so that advertising resumes.

In one embodiment, the terminal 102 is also provided with a physical reset device, for example a reset key so that a merchant can re-enable advertising if required. In another embodiment the reset may be carried out remotely, but this might in some cases be less secure than using a physical reset device.

The reset key, when operated can cause the payment terminal to reboot into a quiescent state in which it can start advertising, or may simply override the "stop advertising" command and send to the processing circuitry a "resume advertising" command.

In an embodiment, the payment terminal 102 is further configured to receive, from the server 106, data corresponding to transaction information, and communicate at least a part of the data corresponding to the transaction information to the smartphone 104b via the communication channel.

In an embodiment, the payment terminal 102 is incapable of displaying the account balance of the user; however, the portable communication device 104b is configured to display the account balance of the user post the transaction. Data corresponding to the account balance may be encrypted such that only the user's smartphone 104b is capable of decrypting said data.

It shall be noted that, some of the encryption, decryption, authentication and security technologies that are typically used at different steps are not discussed, so as not to unnecessarily obscure aspects of the embodiments.

The processes described above is described as a sequence of steps, this was done solely for the sake of illustration. Accordingly, it is contemplated that some steps may be added, some steps may be omitted, the order of the steps 1 may be re-arranged, or some steps may be performed simultaneously.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

It will be appreciated that the invention has been described by way of example only. Various modifications may be made to the techniques described herein without departing from the spirit and scope of the appended claims. The disclosed techniques comprise techniques which may be provided in a stand-alone manner, or in combination with one another. Therefore, features described with respect to one technique may also be presented in combination with another technique.

The invention claimed is:

1. A personal communication device for processing financial information via a payment terminal, the payment terminal being configured to output a wireless pairing advertisement signal, wherein the personal communication device is configured to:
   receive the wireless pairing advertisement signal of a payment terminal;
   determine whether the wireless pairing advertisement signal received at the personal communication device has a strength above a first signal strength threshold;
   if the received signal strength is above the first signal strength threshold, emit a wireless request signal to pair with the payment terminal thereby to establish an exclusive communication channel with the personal communication device, wherein the wireless request signal is adapted to cause the payment terminal to establish the exclusive communication channel, wherein the exclusive communication channel is only between the personal communication device and the payment terminal; and
   when the personal communication device receives notification over the exclusive communication channel that a financial transaction is concluded, the personal communication device is further configured to close down the exclusive communication channel so that the payment terminal can output a wireless advertisement signal again to establish another communication channel with another personal communication device.

2. The personal communication device of claim 1, having a user input device for initiating the step of receiving the signal.

3. The payment terminal of claim 1 wherein the personal communication device is configured to make payment without using Internet or a valid cellular data connection.

4. The payment terminal of claim 3 wherein the personal communication device is configured to display the account balance of a user making a payment using the personal communication device before and/or after the financial transaction without using Internet or a valid cellular data connection.

5. A merchant payment terminal for processing financial transactions involving a personal communication device, wherein the payment terminal is configured to:
   emit a wireless signal advertising its ability to communicate with the personal communication device;
   in reply to a wireless response signal of the personal communication device, cease to emit the wireless signal indicative of the ability to communicate with the personal communication device so that exclusive communication with only one personal communication device at a time is possible; and
   in response to a wireless release signal of the personal communication device, starting emission of the wireless signal to advertise its ability to communicate with another personal communication device, whereby communication with the another personal communication device becomes possible.

6. The payment terminal of claim 5, having a reset device for physically resetting the terminal if the wireless release signal is not received.

7. The payment terminal of claim 5, further having a connection for connecting to a server.

8. The payment terminal of claim 7 further configured to:
   receive data identifying a user attempting to make a payment connected to the transaction, upon establishing the communication channel; and
   communicate at least the data identifying the user, data identifying a merchant and data identifying payment amount to the server to process the transaction, thereby enabling the personal communication device to make payment without using Internet.

9. The payment terminal of claim 7 further configured to:
   receive, from the server, data corresponding to account balance of a user making a payment using the personal communication device; and
   communicate the data corresponding to the account balance to the personal communication device via the communication channel.

10. A method of processing financial data by a personal communication device via a payment terminal, the payment terminal being configured to output a wireless pairing advertisement signal, the method comprising:
   receiving, at the personal communication device, the wireless pairing advertisement signal of the payment terminal;
   determining whether the received pairing advertisement wireless signal has a strength above a first signal threshold;
   emitting a wireless request signal to pair with the payment terminal thereby to establish a communication channel with the personal communication device as a result of the received signal strength being above the first strength threshold, the wireless request signal causing the payment terminal to establish an exclusive communication channel, wherein the exclusive communication channel is only between the personal communication device and the payment terminal;

receiving notification over the exclusive communication channel that a financial transaction is concluded; and closing down the exclusive communication channel in response to the notification, so that the payment terminal can output a wireless pairing advertisement signal again to establish another exclusive communication channel with another personal communication device.

11. A method of processing financial transactions involving a personal communication device by a payment terminal, the method comprising:

emitting a wireless signal advertising its ability to communicate with the personal communication device;

responsive to receipt of a wireless response signal of the personal communication device, ceasing to emit the wireless signal indicative of the ability to communicate with the personal communication device so that exclusive communication with only one personal communication device at a time is possible; and after a financial transaction is completed and responsive to a wireless release signal of the personal communication device, starting emission of the wireless signal advertising its ability to communicate with another personal communication device, whereby exclusive communication with the another personal communication device becomes possible.

12. A non-transitory processor-readable storage medium storing a machine-readable instruction set stored therein, which, when executed by a processor, causes the processor to perform the steps of:

receiving, at the personal communication device, the wireless pairing advertisement signal of the payment terminal;

determining whether the received wireless pairing advertisement signal has a strength above a first signal threshold;

if the received wireless pairing advertisement signal strength is above the first signal strength threshold, emitting a wireless request signal to pair with the payment terminal thereby to establish a communication channel with the personal communication device, the wireless request signal causing the payment terminal to establish an exclusive communication channel, wherein the exclusive communication channel is only between the personal communication device and the payment terminal;

receiving notification over the exclusive communication channel that a financial transaction is concluded; and closing down the exclusive communication channel in response to the notification, so that the payment terminal can output a wireless pairing advertisement signal again to establish another exclusive communication channel with another personal communication device.

13. A non-transitory processor-readable storage medium storing a machine-readable instruction set stored therein, which, when executed by a processor, causes the processor to perform the steps of:

emitting a wireless signal advertising its ability to communicate with the personal communication device;

responsive to receipt of a wireless response signal of the personal communication device, ceasing to emit the wireless signal indicative of the ability to communicate with the personal communication device so that exclusive communication with only one personal communication device at a time is possible; and after a financial transaction is completed and responsive to a wireless release signal of the personal communication device, starting emission of the wireless signal advertising its ability to communicate with another personal communication device, whereby exclusive communication with the another personal communication device becomes possible.

* * * * *